(12) United States Patent  
Kato et al.

(10) Patent No.: US 7,413,782 B2  
(45) Date of Patent: *Aug. 19, 2008

(54) POLYMERIZING BINAPHTHALENE DERIVATIVES

(75) Inventors: Takashi Kato, Ichihara (JP); Kazuhiko Saigusa, Ichihara (JP); Tomohiro Etou, Ichihara (JP); Kazutoshi Miyazawa, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 649 days.

This patent is subject to a terminal disclaimer.

(21) Appl. No.: 11/058,038

(22) Filed: Feb. 14, 2005

(65) Prior Publication Data  
US 2005/0179005 A1 Aug. 18, 2005

(30) Foreign Application Priority Data  
Feb. 18, 2004 (JP) .............................. 2004-041944

(51) Int. Cl.  
C09K 19/38 (2006.01)  
C09K 19/32 (2006.01)  
C09K 19/34 (2006.01)  
C09K 19/12 (2006.01)  
C09K 19/20 (2006.01)  
C09K 19/30 (2006.01)  
C07C 69/76 (2006.01)

(52) U.S. Cl. .............. 428/1.1; 252/299.62; 252/299.63; 252/299.64; 252/299.65; 252/299.66; 252/299.67; 252/299.61; 560/56; 560/80; 560/95; 560/100

(58) Field of Classification Search ............ 252/299.01, 252/299.5, 299.62, 299.61, 299.63, 299.64, 252/299.65, 299.67; 428/1.1; 560/56, 80, 560/95, 100  
See application file for complete search history.

(56) References Cited  
U.S. PATENT DOCUMENTS

| 5,599,478 | A | 2/1997 | Matumoto | ............. 252/299.01 |
| 6,685,998 | B1 | 2/2004 | Nishikawa | ................... 428/1.3 |
| 7,070,711 | B2 | 7/2006 | Seki et al. | .............. 252/299.61 |
| 2005/0213009 | A1* | 9/2005 | Yanai et al. | .................. 349/137 |

FOREIGN PATENT DOCUMENTS

| GB | 2298202 | 2/1996 |
| JP | 08-087008 | 4/1996 |
| JP | 2002-006138 | 1/2002 |
| JP | 2003-203629 | 7/2003 |
| WO | WO 02/28985 | 4/2002 |

OTHER PUBLICATIONS

"A Novel Transflective TFT-LCD using Cholesteric Half Reflector" Yuzo Hisatake, Toshiya Ohtake, Atsuko Oone and Yoshinori Higuchi/ Toshiba Co. LCD R&D Center / Asia Display / IDW 2001 / p. 129-132.

"Physical Properties of Liquid Crystalline Materials" W.H. De Jeu /Liquid Crystal Monograph vol. 1 edited by George Gray, University of Hull/ Gordon and Breach Science Publisher 1980 / p. 34-48.

* cited by examiner

Primary Examiner—Shean C Wu  
(74) Attorney, Agent, or Firm—J.C. Patents

(57) ABSTRACT

Provided are a polymerizing liquid-crystalline compound of formula (1).

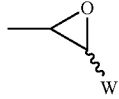 (P8)

In formula (1), $Q^1$ to $Q^4$ each independently represent a formula (2), a hydrogen atom, a halogen atom, an alkyl group or the like; at least two of $Q^1$ to $Q^4$ are a formula (2) and may differ from each other. In formula (2), A independently represent a 1,4-cyclohexylene group, a 1,4-phenylene group or the like; X independently represents a single bond, an alkylene group or the like; Z represents a single bond, —COO—, —OCO— or the like; n indicates an integer of from 0 to 3; p represents any one polymerizing group of formulae (P1) to (P8); W represents a hydrogen atom, a halogen atom, an alkyl group or the like. When $Q^1$ and $Q^2$ are both hydrogen atoms and when $Q^3$ and $Q^4$ are both formula (2), then p must not be (P8).

28 Claims, No Drawings

POLYMERIZING BINAPHTHALENE DERIVATIVES

BACKGROUND OF THE INVENTION

1. Field of the Invention

The present invention relates to an optically-active compound having a 1,1'-binaphthalene ring structure and a polymerizing group, to a liquid-crystal composition containing it, to a polymer obtained by polymerizing the optically-active compound or the liquid-crystal composition, and to use of the polymer. The polymer can be utilized for shaped articles of optical anisotropy, polarizers, optical compensators, brightness-improving films, orientation films, color filters, holographic devices, liquid-crystal display devices, adhesives, synthetic polymers of mechanical anisotropy, cosmetics, decorations, forgery-preventing devices, non-linear optical devices, and optical memory devices that are containing the shaped articles, etc.

2. Description of the Related Art

Polymerizing liquid-crystalline compounds are utilized these days for shaped articles of optical anisotropy. They have optical anisotropy in a liquid-crystal condition, and their orientation is fixed through polymerization.

When an optically-active compound is added to a polymerizing liquid-crystal composition, then it induces a helical structure. Depending on the helical pitch, the composition may have various applications for optical devices. Specifically, the light propagation along the helical axis is grouped into applications in a case of (1) $\lambda$ much smaller than P ($\lambda \ll P$) and in a case of (2) $\lambda$ nearly equal to P ($\lambda \approx P$), depending on the intended wavelength ($\lambda$) and the helical pitch length (P).

When the intended $\lambda$ is corresponding to visible light, then the case (1) $\lambda \ll P$ corresponds to 1 ($\mu$m)<P. The application of this case is further grouped into a case satisfying the Morgan condition and a case not satisfying it. (A) When the Morgan condition is satisfied, or that is, when $\Phi \ll 2\pi \Delta n d/\lambda$ is satisfied, then the linearly-polarized light that is parallel to or perpendicular to the optical axis direction on the light incident side directly goes out as it is the linearly-polarized light, and functions as a rotator. In this, $\Phi$ indicates the total twist angle, d indicates the thickness, and $\Delta n$ indicates the birefringence of liquid crystal. (B) When the Morgan condition is not satisfied, then the linearly-polarized light shows birefringence to be determined by $\Phi$, d and $\Delta n$.

The rotator may be applied to optical devices for head-up displays or projectors. The twist-oriented birefringence application is, for example, for optical compensation in STN (Super-Twisted Nematic) liquid-crystal displays (see Patent Reference 1).

When the intended $\lambda$ is corresponding to visible light in the case (2) $\lambda \approx P$, and for example, when the twisted direction of the helical structure is in the right-handed direction, then the liquid-crystal film may selectively reflect only the right-handed circularly-polarized light having a wavelength $\lambda$ within a range of $no \times P < \lambda < ne \times P$ (where no indicates the ordinal refractive index of the liquid-crystal layer; and ne indicates the extra-ordinal refractive index of the liquid-crystal layer), but may transmit all the other circularly-polarized light including the right-handed circularly-polarized light having a wavelength not falling within that range as above and the left-handed circularly-polarized light of all wavelengths. In other words, the liquid-crystal film of the case can selectively separate right-handed circularly-polarized light having a specific wavelength from left-handed circularly-polarized light (circular dichroism). From the viewpoint of applications of optical devices, concretely, there are two different cases, (A) $350/n_{ave}$ (nm)$<P \leq 800/n_{ave}$ (nm), or that is, in this case, the circular dichroic wavelength region is in a visible light region; and (B) $P < 350/n_{ave}$ (nm), or that is, in this case, the circular dichroic wavelength region is in a UV region. In these, $n_{ave} = ((ne^2 + no^2)/2)^{0.5}$.

In the case (A) $350/n_{ave}$ (nm)$<P \leq 800/n_{ave}$ (nm), when non-polarized light is introduced into the liquid-crystal film, then the reflected light and the transmitted light are colored in accordance with the wavelength for the circular dichroism. Based on the coloration mode, the liquid-crystal film may be applied to designs for decorative members and to color filters for liquid-crystal display devices. Further, since the reflected light and the transmitted light have a metallic gloss peculiar to them and their colors vary depending on the viewing angle, and since such optical properties of the liquid-crystal film could not be duplicated in ordinary duplicators, the film can be applied to forgery prevention. In addition, based on the circularly-polarized light-separating function thereof, the film can be used for improving the light utilization efficiency in liquid-crystal display devices. For example, there is proposed a constitution of laminating a polarizer with a ¼$\lambda$ plate and an optically-anisotropic film that expresses a function of separating circularly-polarized light (see Non-Patent Reference 1). In these applications, the film is required to express its circularly-polarized light-separating function in the entire visible light region (wavelength region of from 350 to 750 nm), for which plural layers each having a different pitch may be laminated or the film is so designed that its pitch may continuously vary in the direction of the thickness thereof. The reflection spectrum width $\Delta \lambda$ is wider when the birefringence anisotropy ($\Delta n$) is larger, from their relational formula, $\Delta \lambda = \Delta n \times P$. The center wavelength $\lambda c$ of the reflection spectrum is computed from its relational formula, $\lambda c = n_{ave} \times P$.

Apart from the above, when the same circular polarization-separating function is used and when the range is defined to $700/n_{ave}$ (nm)$<P \leq 1.5/n_{ave}$ ($\mu$m), then the liquid-crystal film may be applied to UV or near-IR reflection filters, etc.

In the case (B) $P \leq 350/n_{ave}$ (nm), the refractive index in the visible light region to the plane vertical to the helical axis of the film is represented by $((ne^2 + no^2)/2)^{0.5}$, and the refractive index in the visible light region in the direction of the helical axis is equal to no (see Non-Patent Reference 2).

The optically-anisotropic film having such optical characteristics is referred to as a negative C-plate. In a liquid-crystal display device that exhibits black display (dark condition) when the liquid-crystalline molecules having a positive birefringence are oriented vertically to the substrate therein, there occurs no birefringence owing to the orientation of the liquid-crystalline molecules in the normal direction of the display device. Accordingly, in the display device of the type, a remarkably high contrast can be obtained in the normal direction. However, birefringence occurs when the viewing angle is out of alignment with the normal line of the display device and the transmittance in black display (dark condition) increases. Namely, in the display device, the contrast decreases to the viewing angle in the oblique direction. The negative C-plate can compensate the birefringence which occurs when the viewing angle is out of alignment with the normal direction of the liquid crystal orientation in the display device. As a result, the negative C-plate can be an optical compensator suitable for improving the viewing angle characteristics of various display devices such as VA (vertically aligned), TN (twisted nematic), OCB (optically-compensated birefringence) and HAN (hybrid aligned nematic) devices.

At present, compressed polymer films or films of discotic liquid crystals having planar-oriented negative birefringence (see Patent Reference 2) are used for optical compensators.

Utilizing polymers of cholesteric liquid crystals of liquid-crystalline molecules having a positive birefringence broadens the latitude in planning refractive index anisotropy and wavelength dispersion. Negative C-plates can be combined with various optical compensation layers.

In optical planning for the respective applications as above, the pitch and Δn are separately controlled.

For all the applications mentioned above, it is desired to develop photopolymerizing cholesteric liquid-crystal compositions, of which the properties before curing are characterized in that they have a nematic phase at room temperature and have a broad nematic phase, they have broad orientation latitude and they are rapidly curable through exposure to UV rays, and of which the properties after curing are characterized in that they have a suitable Δn, they are transparent and they have good heat resistance and moisture resistance.

When compounds are optimized, they must satisfy polymerizability and physical and chemical properties of the resulting polymers, in addition to the above-mentioned optical properties. The physical and chemical properties which the compounds and their polymers must satisfy include the polymerization speed of the compounds, the polymerization degree of the polymers, as well as the transparency, mechanical strength, coatability, solubility, crystallinity, shrinkage, water permeability, water absorbability, vapor permeability, melting point, glass transition point, clear point, heat resistance and chemical resistance thereof.

When an optically-active compound is added to a liquid-crystal compound, then it induces a helical structure (see Patent Reference 3 or 4). The pitch (p) depends on the amount of the optically-active compound added (concentration, c) and the helical twisting power (HTP) thereof. $p = HTP^{-1} \times c^{-1}$. Liquid-crystal compositions having a helical structure can be utilized in various applications. For example, there are mentioned PC (phase-change) display devices, guest-host display devices, TN display devices, STN display devices, SSCT (surface-stabilized cholesteric texture) display devices, PSCT (polymer-stabilized cholesteric texture) display devices, N-type C-plates (negative C-plates), etc.

In all these applications, it is desirable that the amount of the optically-active compound to be added is minimized in order that the compound added does not have any negative influence on the other physical properties such as viscosity and liquid crystallinity of the liquid-crystal compositions. For this, optically-active compounds having a large HTP are desired. In general, optically-active compounds have a low solubility in liquid-crystal compositions, and therefore it is difficult to increase the amount of the compound that may be added to the composition. Accordingly, optically-active compounds having a large HTP are desired.

To applications for polarizers, optical compensators such as N-type C-plates, orientation films, color filters, adhesives, synthetic polymers having mechanical anisotropy, cosmetics, decorations and forgery-preventing devices, optically-anisotropic shaped articles may be utilized. For these, desired are shaped articles that are excellent in point of the polymerization degree of the polymers, as well as the transparency, mechanical strength, coatability, solubility, crystallinity, shrinkage, water permeability, water absorbability, vapor permeability, melting point, glass transition point, clear point, heat resistance and chemical resistance thereof. In addition, the liquid-crystal composition that contains an optically-active compound must be excellent in point of the polymerization speed thereof.

Patent Reference 1: JP-A 8-87008 (U.S. Pat. No. 5,599,478),
Patent Reference 2: JP-A 2002-6138 (U.S. Pat. No. 6,685,998),
Patent Reference 3: British Patent A-2298202,
Patent Reference 4: WO02/28985 pamphlet,
Non-Patent Reference 1: Y. Hisatake et al., Asia Display/IDW '01 LCT8-2,
Non-Patent Reference 2: W. H. de Jeu, Physical Properties of Liquid Crystalline Materials, Gordon and Breach, New York (1980).

An object of the invention is to provide a polymerizing, 1,1'-binaphthalene ring-having liquid-crystalline compound that has a large HTP and good solubility with other liquid-crystal compounds, and to provide a liquid-crystal composition that contains the compound. Another object of the invention is to provide a polymer having many good properties such as transparency, mechanical strength, coatability, solubility, crystallinity, shrinkage, water permeability, water absorbability, vapor permeability, melting point, glass transition point, clear point, heat resistance and chemical resistance, and to provide an optically-anisotropic shaped article formed of the polymer. Still another object of the invention is to provide polarizers, optical compensators, orientation films, color filters, holographic devices, liquid-crystal display devices, adhesives, synthetic polymers having mechanical anisotropy, cosmetics, decorations, forgery-preventing devices, non-linear optical devices and optical memory devices that comprise the polymer.

SUMMARY OF THE INVENTION

The invention includes at least one compound of the following formula (1), a liquid-crystal composition containing the compound, and a polymer obtained by polymerizing the compound or the composition.

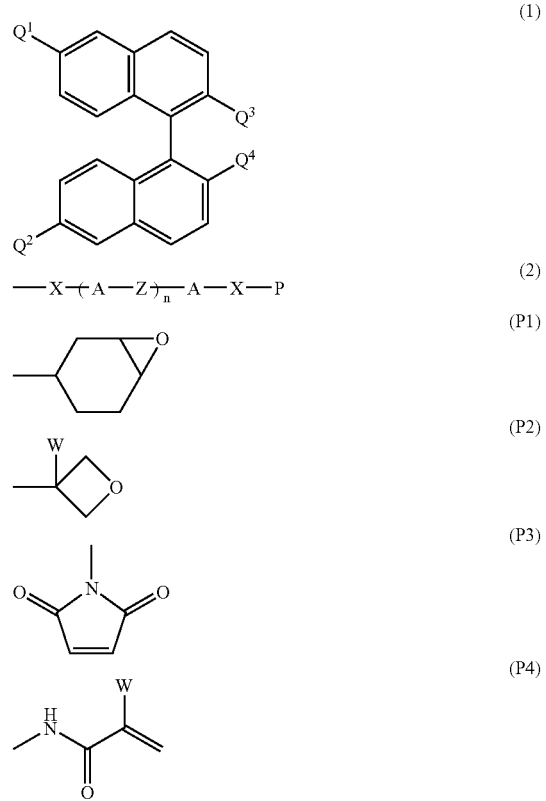

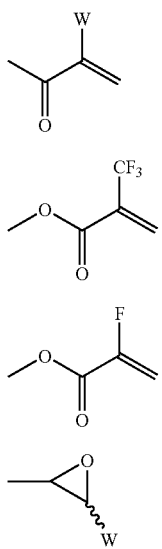

In formula (1), $Q^1$ to $Q^4$ each independently represent a formula (2), a hydrogen atom, a halogen atom, or an alkyl group having from 1 to 30 carbon atoms; in the alkyl group, any —$CH_2$— may be substituted with —O—, —S—, —COO—, —OCO—, —CH=CH— or —C≡C—, and any hydrogen may be substituted with a halogen atom; at least two of $Q^1$ to $Q^4$ are the formula (2) and may differ from each other; in formula (2), A independently represents a 1,4-cyclohexylene group, a 1,4-phenylene group, a 1,4-cyclohexenylene group, a pyridine-2,5-diyl group, a pyridazine-3,6-diyl group, a pyrimidine-2,5-diyl group, a bicyclo[2.2.2]octane-1,4-diyl group, a naphthalene-2,6-diyl group, a tetrahydronaphthalene-2,6-diyl group, a decalin-2,6-diyl group, or a 1,3-dioxane-2,5-diyl group; any hydrogen in these rings may be substituted with a halogen atom, an alkyl group having from 1 to 3 carbon atoms or a fluoroalkyl group having from 1 to 3 carbon atoms; X independently represents a single bond, or an alkylene group having from 1 to 20 carbon atoms; any —$CH_2$— in the alkylene group may be substituted with —O—, —S—, —COO— or —OCO—, and any hydrogen therein may be substituted with a fluorine atom; Z represents a single bond, —COO—, —OCO—, —$CH_2CH_2$—, —$(CH_2)_4$—, —$CH_2O$—, —$OCH_2$—, —$(CH_2)_3O$—, —$O(CH_2)_3$—, —$CF_2CF_2$—, —CH=CH—, —CH=CHCH$_2$CH$_2$—, —CH$_2$CH$_2$CH=CH—, —CH=CHCH$_2$O—, —OCH$_2$CH=CH—, —CF=CF—, —C≡C—, —CF$_2$O—, —OCF$_2$—, —CH$_2$CH$_2$CF$_2$O—, —OCF$_2$CH$_2$CH$_2$—, —CH$_2$CH$_2$COO—, —OCOCH$_2$CH$_2$—, —CH=CHCOO—, —OCOCH=CH—, —C≡CCOO— or —OCOC≡C—; n indicates an integer of from 0 to 3; when n is 1, 2 or 3, then plural A's may be the same or different; when n is 2 or 3, then plural Z's may be the same or different; P represents any one of polymerizing groups of formulae (P1) to (P8); W represents a hydrogen atom, a halogen atom, an alkyl group having from 1 to 3 carbon atoms, or a fluoroalkyl group having from 1 to 3 carbon atoms; provided that when $Q^1$ and $Q^2$ are both hydrogen atoms and when $Q^3$ and $Q^4$ are both formula (2), then P must not be (P8).

DETAILED DESCRIPTION OF THE INVENTION

Compound (1) has a large helical twisting power. It can be polymerized through exposure to electromagnetic waves. Compound (1) has good solubility with any other liquid-crystal compound, and it lowers the crystallization temperature of the composition produced by mixing the two. The polymer obtained from the liquid-crystal composition that contains compound (1) has many good properties including transparency, mechanical strength, coatability, solubility, crystallinity, shrinkage, water permeability, water absorbability, vapor permeability, melting point, glass transition point, clear point, heat resistance and chemical resistance. The polymer obtained from the liquid-crystal composition that contains compound (1) is usable for polarizers, optical compensators, brightness-improving films, orientation films, color filters, holographic devices, liquid-crystal display devices, adhesives, synthetic polymers having mechanical anisotropy, cosmetics, decorations, forgery-preventing devices, non-linear optical devices, optical memory devices.

The terms used in the invention are described. The term of "liquid-crystalline compounds" is a generic term for those having a liquid-crystal phase, and those not having a liquid-crystal phase but useful as a component of liquid-crystal compositions. Liquid-crystalline compounds, liquid-crystal compositions and liquid-crystal display devices may be referred to as compounds, compositions and devices, respectively. Compounds represented by formula (1) may be referred to as compounds (1) or compounds of formula (1). Acrylate and methacrylate may be referred to as (meth) acrylate.

The word "any" is meant to indicate that "not only position but also number may be any position or any number". The expression saying that "any A may be substituted with B, C, D or E" is meant to include a case where one A is substituted with B, C, D or E, a case where plural A's are all substituted with any one of B, C, D and E, and in addition to these, further include a case of a combination of at least two of A substituted with B, A substituted with C, A substituted with D and A substituted with E. One example of a sentence "any —$CH_2$— may be substituted with —O—, —CH=CH— or the like" is described. When any —$CH_2$— in $C_4H_9$— is substituted with —O— or —CH=CH—, then a part of the resulting groups are $C_3H_7O$—, $CH_3O(CH_2)_2$—, $CH_3OCH_2O$—, $H_2C=CH(CH_2)_3$—, $CH_3CH=CH(CH_2)_2$—, and $CH_3CH=CHCH_2O$—. In consideration of the chemical stability of the compounds, $CH_3OCH_2O$— in which the two oxygen atoms are not directly adjacent to each other is preferred to $CH_3OOCH_2$— in which the two oxygen atoms are directly adjacent to each other.

We, the present inventors have assiduously studied so as to attain the above-mentioned objects and, as a result, have found that the 1,1'-binaphthalene ring.having liquid-crystalline compounds of the invention have a large HTP and good polymerizability and have good compatibility with other compounds. In addition, we have further found that the liquid-crystal composition containing the compound of the invention has good coatability, orientation capability and polymerizability, and its polymers are excellent for optical functional thin films such as reflective polarizers, phase retarders, brightness-improving films and negative C-plates. On the basis of these findings, we have completed the present invention. The invention includes the following [1] to [26].

[1] A compound of a formula (1):

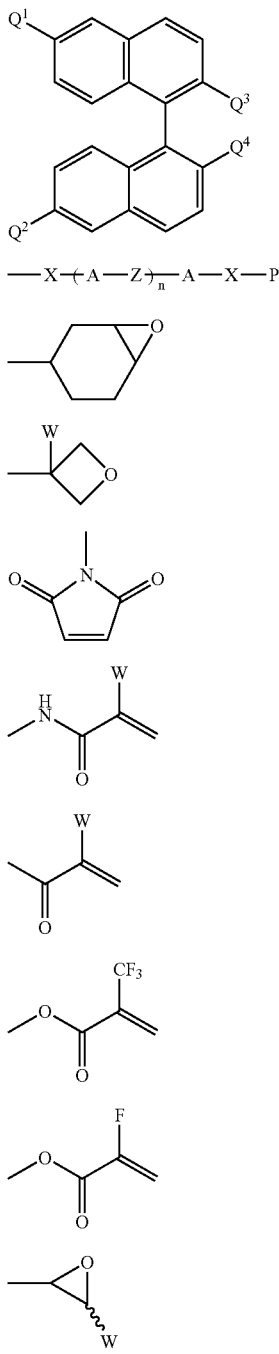

wherein, in formula (1), $Q^1$ to $Q^4$ each independently represent a formula (2), a hydrogen atom, a halogen atom, or an alkyl group having from 1 to 30 carbon atoms; in the alkyl group, any —CH$_2$— may be substituted with —O—, —S—, —COO—, —OCO—, —CH=CH— or —C≡C—, and any hydrogen may be substituted with a halogen atom; at least two of $Q^1$ to $Q^4$ are the formula (2) and may differ from each other; in formula (2), A independently represents a 1,4-cyclohexylene group, a 1,4-phenylene group, a 1,4-cyclohexenylene group, a pyridine-2,5-diyl group, a pyridazine-3,6-diyl group, a pyrimidine-2,5-diyl group, a bicyclo[2.2.2]octane-1,4-diyl group, a naphthalene-2,6-diyl group, a tetrahydronaphthalene-2,6-diyl group, a decalin-2,6-diyl group, or a 1,3-dioxane-2,5-diyl group; any hydrogen in these rings may be substituted with a halogen atom, an alkyl group having from 1 to 3 carbon atoms or a fluoroalkyl group having from 1 to 3 carbon atoms; X independently represents a single bond, or an alkylene group having from 1 to 20 carbon atoms; any —CH$_2$— in the alkylene group may be substituted with —O—, —S—, —COO— or —OCO—, and any hydrogen therein may be substituted with a fluorine atom; Z represents a single bond, —COO—, —OCO—, —CH$_2$CH$_2$—, —(CH$_2$)$_4$—, —CH$_2$O—, —OCH$_2$—, —(CH$_2$)$_3$O—, —O(CH$_2$)$_3$—, —CF$_2$CF$_2$—, —CH=CH—, —CH=CHCH$_2$CH$_2$—, —CH$_2$CH$_2$CH=CH—, —CH=CHCH$_2$O—, —OCH$_2$CH=CH—, —CF=CF—, —C≡C—, —CF$_2$O—, —OCF$_2$—, —CH$_2$CH$_2$CF$_2$O—, —OCF$_2$CH$_2$CH$_2$—, —CH$_2$CH$_2$COO—, —OCOCH$_2$CH$_2$—, —CH=CHCOO—, —OCOCH=CH—, —C≡CCOO— or —OCOC≡C—; n indicates an integer of from 0 to 3; when n is 1, 2 or 3, then plural A's may be the same or different; when n is 2 or 3, then plural Z's may be the same or different; P represents any one of polymerizing groups of formulae (P1) to (P8); W represents a hydrogen atom, a halogen atom, an alkyl group having from 1 to 3 carbon atoms, or a fluoroalkyl group having from 1 to 3 carbon atoms; provided that when $Q^1$ and $Q^2$ are both hydrogen atoms and when $Q^3$ and $Q^4$ are both formula (2), then P must not be (P8).

[2] The compound of [1], wherein $Q^1$ to $Q^4$ are independently a formula (2), a hydrogen atom, a fluorine atom, a chlorine atom, a bromine atom, or an alkyl group having from 1 to 25 carbon atoms; in the alkyl group, any —CH$_2$— may be substituted with —O—, —S—, —COO—, —OCO—, —CH=CH— or —C≡C—, and any hydrogen may be substituted with a halogen atom; A independently represents a 1,4-cyclohexylene group or a 1,4-phenylene group; any hydrogen in these rings may be substituted with a halogen atom, an alkyl group having from 1 to 3 carbon atoms or a fluoroalkyl group having from 1 to 3 carbon atoms; X independently represents a single bond, —COO—, —OCO— or an alkylene group having from 1 to 10 carbon atoms; any —CH$_2$— in the alkylene group may be substituted with —O—, and any hydrogen therein may be substituted with a fluorine atom; Z represents a single bond, —COO—, —OCO—, —CH$_2$CH$_2$—, —CH$_2$O—, —OCH$_2$—, —CH=CH—, —C≡C—, —CH$_2$CH$_2$COO—, —OCOCH$_2$CH$_2$—, —CH=CHCOO— or —OCOCH=CH—.

[3] The compound of [1], wherein $Q^1$ to $Q^4$ are independently a formula (2), a hydrogen atom, a fluorine atom, a chlorine atom, a bromine atom, or an alkyl group having from 1 to 10 carbon atoms; in the alkyl group, any —CH$_2$— may be substituted with —O—, —S—, —COO—, —OCO—, —CH=CH— or —C≡C—, and any hydrogen may be substituted with a halogen atom; A independently represents a 1,4-cyclohexylene group, a 1,4-phenylene group, or a 1,4-phenylene group in which any hydrogen is substituted with a fluorine atom, a chlorine atom, a methyl group or a trifluoromethyl group; X independently represents a single bond or an alkylene group having from 1 to 10 carbon atoms; any —CH$_2$— in the alkylene group may be substituted with —O—, and any hydrogen therein may be substituted with a fluorine atom; Z represents a single bond, —COO—, —OCO—, —CH$_2$CH$_2$—, —CH$_2$O—, —OCH$_2$—, —C≡C—, —CH=CHCOO— or —OCOCH=CH—.

[4] The compound of [2] or [3], wherein, in formula (2) in [1], P is (P2), (P3), (P5), (P6), (P7) or (P8).

[5] The compound of [2] or [3], wherein, in formula (2) in [1], P is (P2), (P3), (P6), (P7) or (P8).

[6] The compound of [2] or [3], wherein, in formula (2) in [1], P is (P2).

[7] The compound of [1], wherein $Q^1$ and Q2 are independently a halogen atom or an alkyl group having from 1 to 30 carbon atoms; in the alkyl group, any —CH$_2$— may be substituted with —O—, —S—, —COO—, —OCO—, —CH=CH— or —C≡C—, and any hydrogen may be substituted with a halogen atom; $Q^3$ and $Q^4$ are independently a formula (2) and may differ from each other; and P is (P8).

[8] The compound of [1], wherein $Q^1$ and $Q^2$ are independently a fluorine atom, a chlorine atom, a bromine atom, or an alkyl group having from 1 to 25 carbon atoms; in the alkyl group, any —CH$_2$— may be substituted with —O—, —S—, —COO—, —OCO—, —CH=CH— or —C≡C—, and any hydrogen may be substituted with a halogen atom; $Q^3$ and $Q^4$ are independently a formula (2) and may differ from each other; A is independently a 1,4-cyclohexylene group or a 1,4-phenylene group, and any hydrogen in these rings may be substituted with a halogen atom, an alkyl group having from 1 to 3 carbon atoms or a fluoroalkyl group having from 1 to 3 carbon atoms; X is independently a single bond, —COO—, —OCO— or an alkylene group having from 1 to 10 carbon atoms, in the alkylene group, any —CH$_2$— may be substituted with —O—, and any hydrogen may be substituted with a fluorine atom; Z is a single bond, —COO—, —OCO—, —CH$_2$CH$_2$—, —CH$_2$O—, —OCH$_2$—, —CH=CH—, —C≡C—, —CH$_2$CH$_2$COO—, —OCOCH$_2$CH$_2$—, —CH=CHCOO— or —OCOCH=CH—; and P is (P8).

[9] The compound of [1], wherein $Q^1$ and $Q^2$ are independently a fluorine atom, a chlorine atom, a bromine atom, or an alkyl group having from 1 to 10 carbon atoms; in the alkyl group, any —CH$_2$— may be substituted with —O—, —S—, —COO—, —OCO—, —CH=CH— or —C≡C—, and any hydrogen may be substituted with a halogen atom; $Q^3$ and $Q^4$ are independently a formula (2) and may differ from each other; A is independently a 1,4-cyclohexylene group, a 1,4-phenylene group, or a 1,4-phenylene group in which any hydrogen is substituted with a fluorine atom, a chlorine atom, a methyl group or a trifluoromethyl group; X is independently a single bond or an alkylene group having from 1 to 10 carbon atoms, in the alkylene group, any —CH$_2$— may be substituted with —O—, and any hydrogen may be substituted with a fluorine atom; Z is a single bond, —COO—, —OCO—, —CH$_2$CH$_2$—, —CH$_2$O—, —OCH$_2$—, —C≡C—, —CH=CHCOO— or —OCOCH=CH—; and P is (P8).

[10] The compound of any one of [1] to [3], wherein, in formula (1) in [1], $Q^1$ to $Q^4$ are independently a formula (2) and may differ from each other; in formula (2) in [1], P is (P8).

[11] A liquid-crystal composition containing at least two compounds, in which at least one compound is a compound of any one of [1] to [10].

[12] The liquid-crystal composition of [11], wherein all the compounds are polymerizing compounds.

[13] The liquid-crystal composition of [11] or [12], wherein at least one compound of any one of [1] to [10] accounts for from 0.01 to 90% by weight relative to the overall amount of the composition, and at least one polymerizing compound selected from a group of compounds of the following formulae (M1) and (M2) accounts for from 10 to 99.99% by weight.

(M1)

(M2)

(P9)

(P10)

(P11)

(P12)

wherein, in formulae (M1) and (M2), $P^1$ independently represents any one polymerizing group of formulae (P9) to (P12); W represents a hydrogen atom, a halogen atom, an alkyl group having from 1 to 3 carbon atoms, or a fluoroalkyl group having from 1 to 3 carbon atoms; $R^1$ represents a hydrogen atom, a fluorine atom, a chlorine atom, —CN, or an alkyl group having from 1 to 20 carbon atoms; in the alkyl group, any —CH$_2$— may be substituted with —O—, —COO— or —OCO—, and any hydrogen may be substituted with a halogen atom; $A^1$ independently represents a 1,4-cyclohexylene group, a 1,4-phenylene group, a 1,4-cyclohexenylene group, a pyridine-2,5-diyl group, a pyrimidine-2,5-diyl group, a naphthalene-2,6-diyl group or a fluorene-2,7-diyl group; in these rings, any hydrogen may be substituted with a halogen atom, an alkyl group having from 1 to 3 carbon atoms, or a halogenoalkyl group having from 1 to 3 carbon atoms; $X^1$ independently represents a single bond or an alkylene group having from 1 to 20 carbon atoms; in the alkylene group, any —CH$_2$— may be substituted with —O—, —COO— or —OCO—; $Z^1$ independently represents a single bond, —COO—, —OCO—, —CH$_2$CH$_2$—, —CH=CH—, —C≡C—, —CH$_2$O—, —OCH$_2$—, —CF$_2$O—, —OCF$_2$—, —CH=CHCOO— or —OCOCH=CH—; s indicates an integer of from 1 to 3; when s is 1, 2 or 3, then plural $A^1$'s may be the same or different; when s is 2 or 3, then plural $Z^1$'s may be the same or different.

[14] The liquid-crystal composition of [13], wherein at least one polymerizing compound selected from the group of compounds of formulae (M1) and (M2) is any one compound of formulae (M1a) to (M2c):

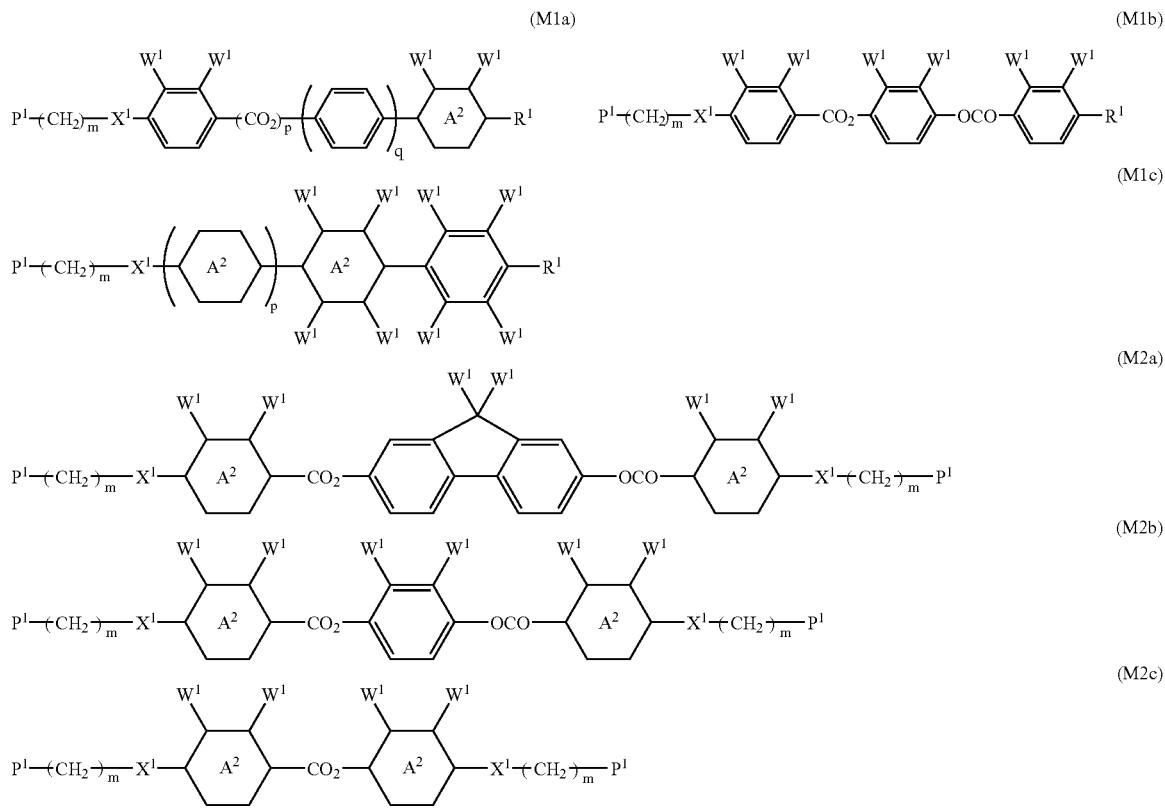

wherein P¹ is any one polymerizing group of formulae (P9) to (P-12); R¹ is a hydrogen atom, a fluorine atom, a chlorine atom, —CN, or an alkyl group having from 1 to 20 carbon atoms; in the alkyl group, any —$CH_2$— may be substituted with —O—, —COO— or —OCO—, and any hydrogen may be substituted with a halogen atom; the ring $A^2$ is independently a 1,4-cyclohexylene group or a 1,4-phenylene group; $W^1$ is independently a hydrogen atom, a halogen atom, an alkyl group having from 1 to 3 carbon atoms or a halogenoalkyl group having from 1 to 3 carbon atoms; $X^1$ is independently a single bond or an alkylene group having from 1 to 20 carbon atoms; in the alkylene group, any —$CH_2$— may be substituted with —O—, —COO— or —OCO—; p and q are independently 0 or 1; m is independently an integer of from 0 to 5.

[15] A polymer obtained through polymerization of at least one compound of [1].

[16] A polymer obtained through polymerization of the composition of any one of [11] to [14].

[17] The polymer of [15] or [16], which has a weight-average molecular weight of from 500 to 1,000,000.

[18] The polymer of [15] or [16], which has a weight-average molecular weight of from 1,000 to 500,000.

[19] An optically-anisotropic shaped article obtained by orienting at least one compound of [1] or the liquid-crystal composition of any one of [11] to [14], and then polymerizing the compound or composition through irradiation with electromagnetic waves to thereby fix the orientation condition of the liquid crystal.

[20] The shaped article of [19], wherein the fixed orientation condition of the liquid crystal is twisted orientation.

[21] An optical device comprising the shaped article of [19] or [20].

[22] The optical device of [21], which has a helical pitch of from 1 nm to less than 200 nm.

[23] The optical device of [21], which exhibits circular dichroism partly or entirely in a wavelength region of from 350 to 750 nm.

[24] The optical device of [21], which exhibits circular dichroism in a UV region of from 100 to 350 nm.

[25] A liquid-crystal display device that contains at least one selected from a group of the polymer of any one of [15] to [18], the shaped article of [19] or [20], and the optical device of any one of [21] to [24].

[26] The compound of [1], wherein, in formula (1), $Q^1$ and $Q^2$ are hydrogen atoms, $Q^3$ and $Q^4$ are independently a formula (2'); in formula (2'), A is independently a 1,4-cyclohexylene group or a 1,4-phenylene group, Z is a single bond or —OCO—, W is a methyl group or an ethyl group, y is an integer of from 2 to 10, and n is 1 or 2.

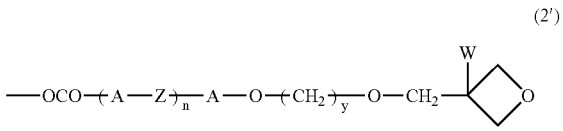

(2')

DESCRIPTION OF THE PREFERRED EMBODIMENTS

The first aspect of the invention is an optically-active compound which has a 1,1'-binaphthalene ring and a polymerizing group and is represented by formula (1). In the formula, $Q^1$ to $Q^4$ each independently represent a formula (2), a hydrogen atom, a halogen atom, or an alkyl group having from 1 to 30 with —O—, —S—, —COO—, —OCO—, —CH=CH— or —C≡C—, and any hydrogen may be substituted with a halogen atom; at least two of $Q^1$ to $Q^4$ are the formula (2) and may differ from each other.

Except the formula (2), preferred examples of $Q^1$ to $Q^4$ are a hydrogen atom, a fluorine atom, a chlorine atom, a bromine atom, and an alkyl group having from 1 to 25 carbon atoms. Except the formula (2), more preferred examples of $Q^1$ to $Q^4$ are a hydrogen atom, a fluorine atom, a chlorine atom, a bromine atom, and an alkyl group having from 1 to 10 carbon atoms. In the alkyl group, any —$CH_2$— may be substituted with —O—, —S—, —COO—, —OCO—, —CH=CH— or —C≡C—, and any hydrogen may be substituted with a halogen atom. The alkyl group may be linear or branched, and may have a cyclic structure. The halogen is preferably chlorine or fluorine.

When $Q^1$ to $Q^4$ except the formula (2) are hydrogen atoms, then the viscosity of the compound is low. When they are any of a fluorine, chlorine or bromine atom, then the dielectric anisotropy of the compound is large. When they are an alkyl group having from 1 to 10 carbon atoms, then the liquid-crystalline property of the compound is good. When they are an alkyl group having from 1 to 10 carbon atoms and having any of —O—, —S—, —COO—, —OCO—, —CH=CH— or —C≡C—, then the liquid-crystalline property of the compound is good and the dielectric anisotropy and the optical anisotropy of the compound may be optimized. When they are an alkyl group having from 1 to 10 carbon atoms and having a halogen atom, then the dielectric anisotropy and the optical anisotropy of the compound may be optimized.

In formula (2), A is a divalent residue of a cyclic structure. A is independently a 1,4-cyclohexylene group, a 1,4-phenylene group, a 1,4-cyclohexenylene group, a pyridine-2,5-diyl group, a pyridazine-3,6-diyl group, a pyrimidine-2,5-diyl group, a bicyclo[2.2.2]octane-1,4-diyl group, a naphthalene-2,6-diyl group, a tetrahydronaphthalene-2,6-diyl group, a decalin-2,6-diyl group, or a 1,3-dioxane-2,5-diyl group. Preferably, A is a 1,4-cyclohexylene group or a 1,4-phenylene group. Any hydrogen in the ring may be substituted with a halogen, an alkyl group having from 1 to 3 carbon atoms, or a fluoroalkyl group having from 1 to 3 carbon atoms.

More preferably, A is a 1,4-cyclohexylene group, a 1,4-phenylene group, or a 1,4-phenylene group in which any hydrogen is substituted with a fluorine atom, a chlorine atom, a methyl group or a trifluoromethyl group. Their specific examples are mentioned below.

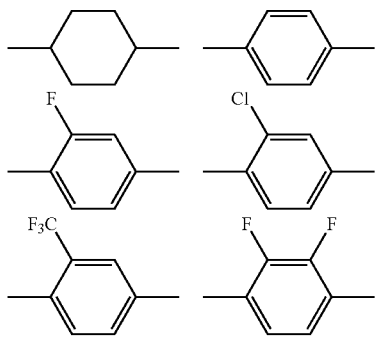

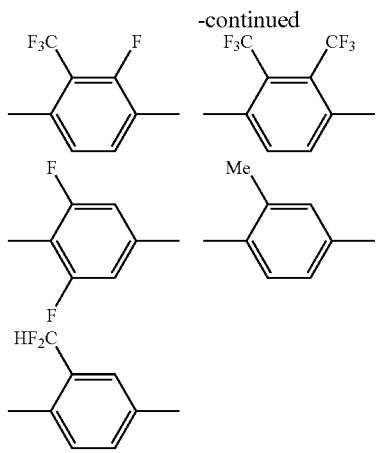

-continued

In these formulae, the rings may bond to the skeleton structure in the opposite direction in point of the right and left sides thereof. For example, the structure of 2-fluoro-1,4-phenylene is the same as that of 3-fluoro-1,4-phenylene, and therefore the latter is not exemplified herein. This rule shall apply to the relation between 2,6-difluoro-1,4-phenylene and 3,5-difluoro-1,4-phenylene. Regarding the steric configuration thereof, 1,4-cyclohexylene and 1,3-dioxane-2,5-diyl preferably has a trans-configuration. Even when the elements in the compound of the invention may contain a larger amount of their isotopes than in naturally-existing compounds, then it has no significant influence on the physical properties of the compound.

In formula (2), Z represents a linking group. Z is a single bond, —COO—, —OCO—, —$CH_2CH_2$—, —$(CH_2)_4$—, —$CH_2O$—, —$OCH_2$—, —$(CH_2)_3O$—, —$O(CH_2)_3$—, —$CF_2CF_2$—, —CH=CH—, —CH=CHCH$_2$CH$_2$—, —CH$_2$CH$_2$CH=CH—, —CH=CHCH$_2$O—, —OCH$_2$CH=CH—, —CF=CF—, —C≡C—, —CF$_2$O—, —OCF$_2$—, —CH$_2$CH$_2$CF$_2$O—, —OCF$_2$CH$_2$CH$_2$—, —CH$_2$CH$_2$COO—, —OCOCH$_2$CH$_2$—, —CH=CHCOO—, —OCOCH=CH—, —C≡CCOO— or —OCOC≡C—. The groups of single bond, —COO—, —OCO—, —CH$_2$CH$_2$—, —(CH$_2$)$_4$—, —CH$_2$O—, —OCH$_2$—, —(CH$_2$)$_3$O—, —O(CH$_2$)$_3$—, —CH=CH—, —CH=CHCH$_2$CH$_2$—, —CH$_2$CH$_2$CH=CH—, —CH=CHCH$_2$O—, —OCH$_2$CH=CH—, —CH$_2$CH$_2$COO—, —OCOCH$_2$CH$_2$—, —CH=CHCOO— and —OCOCH=CH— may be effective for improving the liquid-crystalline property of the compound. The fluorine-containing groups, —CF$_2$CF$_2$—, —CF$_2$O—, —OCF$_2$—, —CH$_2$CH$_2$CF$_2$O— and —OCF$_2$CH$_2$CH$_2$— may be effective for reducing the optical anisotropy but for increasing the dielectric anisotropy of the compound. The triple bond-having groups, —C≡C—, —C≡CCOO— and —OCOC≡C— may be effective for inducing a large optical anisotropy in the compound. Preferred examples of Z are a single bond, —COO—, —OCO—, —CH$_2$CH$_2$—, —CH$_2$O—, —OCH$_2$—, —C≡C—, —CH=CHCOO— and —OCOCH=CH—. More preferred examples of Z are a single bond, —COO—, —OCO—, —CH$_2$CH$_2$—, —CH$_2$O—, —OCH$_2$—, —C≡C—, —CH=CHCOO— and —OCOCH=CH—.

X is independently a single bond, or an alkylene group having from 1 to 20 carbon atoms in which any —CH$_2$— may be substituted with —O—, —S—, —COO— or —OCO—. Preferably, X is a single bond, —COO—, —OCO—, or an alkylene group having from 1 to 10 carbon atoms in which any —CH$_2$— may be substituted with —O—. More preferably, X is a single bond, or an alkylene group having from 1 to 10 carbon atoms in which any —CH$_2$— may be substituted with —O—. X may have a branched structure. Any hydrogen atom in X may be substituted with a fluorine atom. Two X's may be the same or different. When the compound has an asymmetric carbon atom, then it may be a racemate or an optically-active compound. When the compound is an optically-active compound, then it must have a group capable of inducing a twisting direction that is the same as the twisting direction induced by the binaphthalene structure of the compound, in order not to reduce HTP of the compound. When HTP of the compound is desired to be controlled, then a group capable of inducing a twisting direction that is opposite to the twisting direction induced by the binaphthalene structure of the compound may be introduced into the compound.

P is a polymerizing group of formulae (P1) to (P8). W is a hydrogen atom, a halogen atom, an alkyl group having from 1 to 3 carbon atoms, or a fluoroalkyl group having from 1 to 3 carbon atoms. Preferably, W is a hydrogen atom, a fluorine atom, a chlorine atom, a methyl group, an ethyl group or a trifluoromethyl group. n is an integer of from 0 to 3. Preferably, n is an integer of from 0 to 2, more preferably 1 or 2. When n is 1, then two A's may be the same or different. When n is 2, then three A's (or two Z's) may be the same or different. The same shall apply to n=3.

The polymerizing groups (P1), (P2) and (P8) are suitable to cationic polymerization. (P2) and (P8) are preferred for cationic polymerization. (P2) is more preferred for cationic polymerization. The polymerizing groups (P3) to (P7) are suitable to radical polymerization. (P3) and (P5) to (P7) are preferred for radical polymerization. (P3), (P6) and (P7) are more preferred for radical polymerization. The polymerization may be more promoted by adding a polymerization initiator to the system or by optimizing the reaction temperature.

Suitably selecting Q$^1$ to Q$^4$, A, Z, X, P, n and W provides the compounds (1) having the intended physical properties.

The liquid-crystalline residue of formula (2) may have any structure. Its preferred examples are (2-1) to (2-12) mentioned below. In the following, Ph means an optionally-substituted 1,4-phenylene group; Ch means an optionally-substituted 1,4-cyclohexylene group; and X and Z have the same meanings as above.

 —X-Ph-X—P (2-1)

 —X—Ch—X—P (2-2)

 —X-Ph-Z-Ph-X—P (2-3)

 —X—Ch-Z-Ph-X—P (2-4)

 —X-Ph-Z-Ch—X—P (2-5)

 —X—Ch-Z-Ch—X—P (2-6)

 —X-Ph-Z-Ph-Z-Ph-X—P (2-7)

 —X—Ch-Z-Ph-Z-Ph-X—P (2-8)

 —X-Ph-Z-Ch-Z-Ph-X—P (2-9)

 —X-Ph-Z-Ph-Z-Ch—X—P (2-10)

 —X—Ch-Z-Ch-Z-Ph-X—P (2-11)

 —X-Ph-Z-Ch-Z-Ch—X—P (2-12)

Of those (2-1) to (2-12), preferred for (2) are (2-3) to (2-12), and more preferred are (2-3) and (2-7).

Compound (1) well dissolves in other liquid-crystalline compounds. Compound (1) hardly crystallizes at low temperatures in a liquid-crystal composition, and therefore it may broaden the serviceable temperature range (nematic).

Preferred examples of compound (1) are those of formula (1) wherein Q$^1$ and Q$^2$ are hydrogen atoms, Q$^3$ and Q$^4$ are independently a formula (2'); in formula (2'), A is independently a 1,4-cyclohexylene group or a 1,4-phenylene group, Z is a single bond or —OCO—, W is a methyl group or an ethyl group, y is an integer of from 2 to 10, and n is 1 or 2.

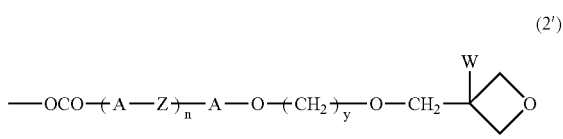

(2')

Methods for producing compound (1) are described. The polymerizing group (P4), (P6) or (P7) may be introduced into the compound by reacting an acrylic acid chloride on the liquid-crystalline residue that has an amino group or a hydroxyl group. The polymerizing group (P1) may be introduced by oxidizing a liquid-crystalline residue that has a cyclohexene ring. Any known intermediate having a cyclohexene-oxide ring may be used. The polymerizing group (P2) or (P8) may be introduced by the use of a known intermediate that has an oxetane ring or an oxirane ring, for example, 3-methyl-3-hydroxymethyloxetane, 3-ethyl-3-hydroxymethyloxetane or epichlorohydrin. The polymerizing group (P8) may be introduced by oxidizing the corresponding terminal unsaturated bond. The polymerizing group (P3) may be introduced by reacting maleic anhydride on a liquid-crystalline residue that has a hydroxyl group. The polymerizing group (P5) may be introduced by reacting a β-chloropropionic acid chloride on a liquid-crystalline residue that has a halogen atom followed by eliminating HCl. The liquid-crystalline residue is —X-(A-Z)$_n$-A-X—.

The structure except the polymerizing group of compound (1) can be constructed by suitably combining techniques of organic synthetic chemistry such as those described in Houben-Wyle, *Methoden der Organische Chemie*, Georg-Thieme Verlag, Stuttgart; *Organic Syntheses*, John & Wily & Sons, Inc.; *Organic Reactions*, John & Wily & Sons, Inc.; *Comprehensive Organic Synthesis*, Pergamon Press. Concretely, it may be constructed by bonding 6-membered ring structure-having organic residues. In the following, MG$^1$ and MG$^2$ each are a monovalent organic residue having at least one 6-membered ring structure, and they may be the same or different. (1A) to (1P) are compounds (1).

Reaction Scheme 1:

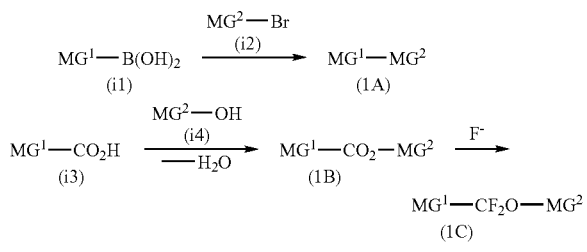

-continued

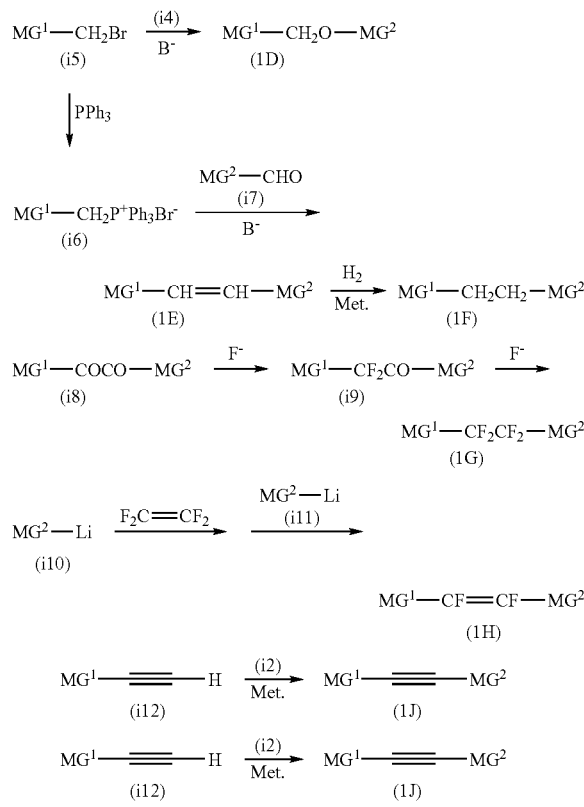

Reaction Scheme 2:

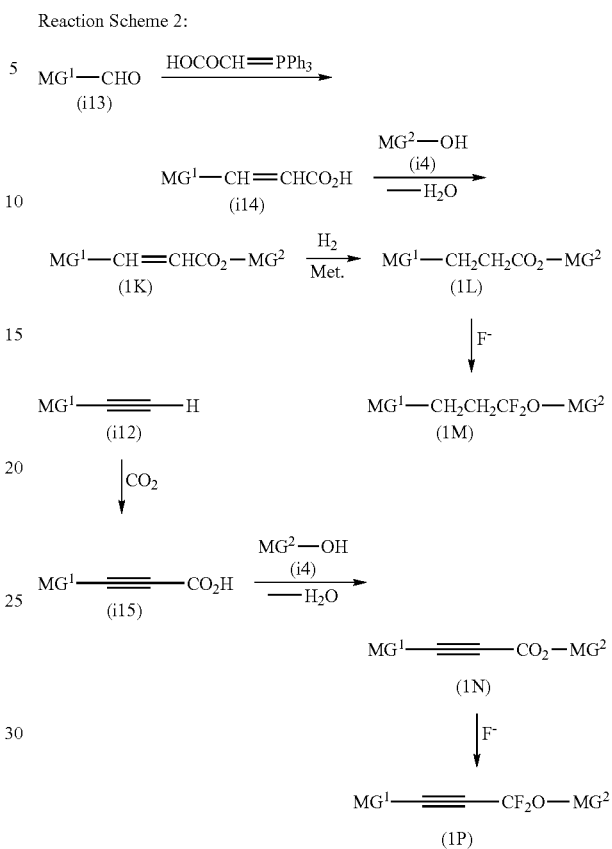

Compounds (1A) to (1J) are produced according to the reaction scheme 1. A compound (1A) in which Z is a single bond is produced through crosslinking coupling reaction of a boronic acid (i1) and a bromide (i2). A compound (1B) wherein the linking group is —COO— is produced through dehydrating condensation of a carboxylic acid (i3) and a hydroxyl group-having compound (i4). Further, when the carboxyl group of the compound (1B) is fluorinated with a fluoride anion, then a compound (1C) where the linking group is —CF$_2$O— is produced. From a bromide (i5), a compound (i4) and a base (B$^-$), produced is a compound (1D) wherein the linking group is —CH$_2$O—. When an ylide obtained from a phosphonium salt (i6) and a base is reacted with an aldehyde (i7) in a mode of Wittig reaction, then it gives a compound (1E) wherein the linking group is —CH═CH—. The salt (i6) is produced by reacting the bromide (i5) with PPh$_3$. A compound (1F) wherein the linking group is —CH$_2$CH$_2$— is produced by reducing the compound (1E) When a diketone (i8) is fluorinated with a fluoride anion, then a compound (1G) wherein the linking group is —CF$_2$CF$_2$— is produced. Since the reaction goes on in two stages, a compound (i9) wherein the linking group is —CF$_2$CO— can be taken out by controlling the molecular equivalent of the fluoride anion. When tetrafluoroethylene is reacted with a lithio compounds (i10) and (i11) in order, then a compound (1H) wherein the linking group is —CF═CF— can be produced. When an alkyne (i12) is reacted with a bromide (i2) in the presence of a transition metal catalyst in a mode of crosslinking coupling reaction, then a compound (1J) wherein the linking group is —C≡C— can be produced.

Compounds (1K) to (1P) are produced according to the reaction scheme 2. A compound (1K) in which the linking group is —CH═CHCOO— can be produced through dehydrating condensation of a carboxylic acid (i14) and a compound (i4). The carboxylic acid (i14) can be produced through Wittig reaction of an aldehyde (i13). A compound (1L) in which the linking group is —CH$_2$CH$_2$COO— can be produced through reduction of the compound (1K). In addition, when the carbonyl group of the compound is fluorinated with a fluoride anion, then a compound (1M) in which the linking group is —CH$_2$CH$_2$CF$_2$O— can be produced. A compound (1N) in which the linking group is —C≡CCOO— can be produced through dehydrating condensation of a carboxylic acid (i15) and a compound (i4). When the carbonyl group of the compound is fluorinated with a fluoride anion, then a compound (1P) in which the linking group is —C≡CCF$_2$O— can be produced. The carboxylic acid (i15) can be produced by lithiating an alkyne (i12) and reacting it with CO$_2$.

Reaction Scheme 3:

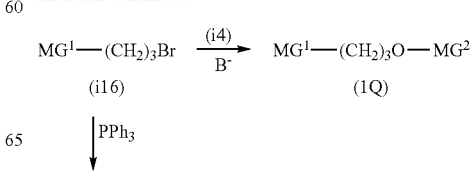

-continued

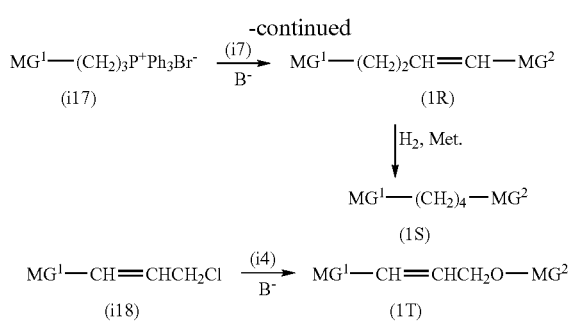

Compounds (1Q) to (1S) are produced according to the reaction scheme 3. A compound (1Q) having a group —(CH$_2$)$_3$O— can be produced from a bromide (i16), a compound (i4) and a base. A compound (1R) in which the linking group is —(CH$_2$)$_2$CH═CH— can be produced by reacting an ylide, which is obtained from a phosphonium salt (i17) and a base, with an aldehyde (i7) in a mode of Wittig reaction. A compound (1S) in which the linking group is —(CH$_2$)$_4$— can be produced by reducing the compound (1R) The salt (i17) can be produced by reacting a bromide (i16) with PPh$_3$. A compound (1T) having a group —CH═CHCH$_2$O— can be produced from a chloride (i18), a compound (i4) and a base.

The helical direction of the compound (1) or the composition containing it may be any one, and the circular polarization separation device that is produced by the use of it may selectively reflect left-handed circularly-polarized light or light-handed circularly-polarized light in accordance with the helical direction thereof.

Of the compounds that are produced according to the methods mentioned above, preferred are Compounds (1-1) to (1-36) mentioned below. In these, L$^1$ represents a hydrogen atom, a halogen atom, or an alkyl group having from 1 to 25 carbon atoms, in which any —CH$_2$— in the alkyl group may be substituted with —O—, —S—, —COO—, —OCO—, —CH═CH— or —C≡C— and any hydrogen therein may be substituted with a halogen atom. X, Z and W have the same meanings as above. L$^1$ in Compounds (1-3) and (1-9) is not a hydrogen atom.

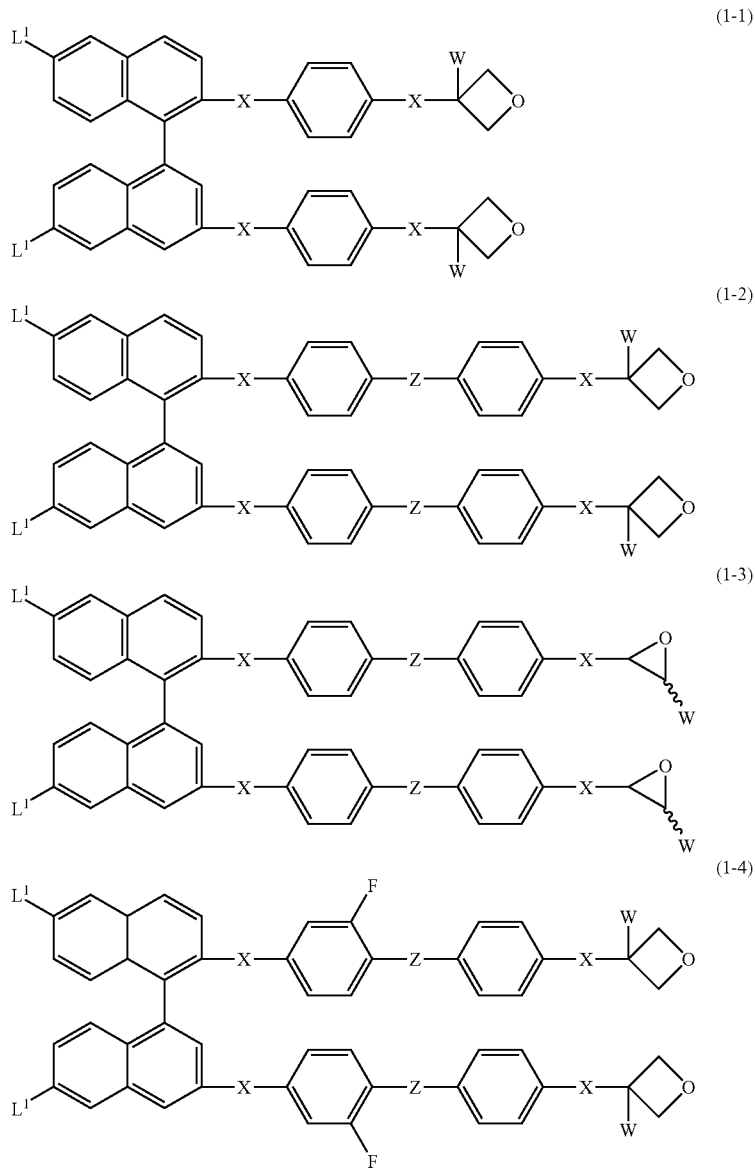

-continued
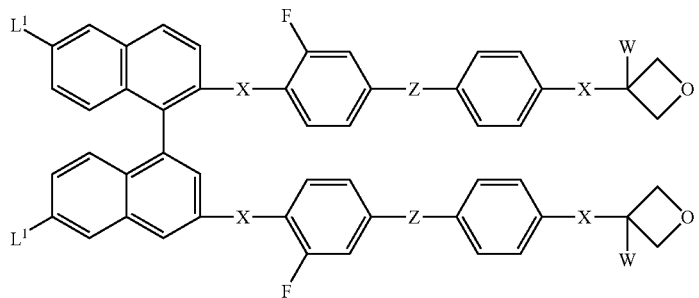
(1-5)
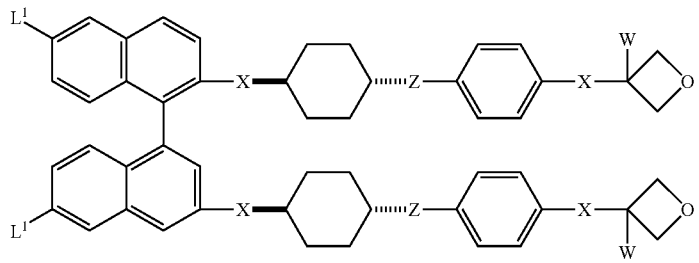
(1-6)
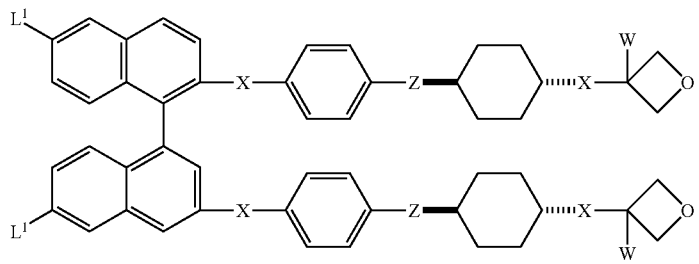
(1-7)
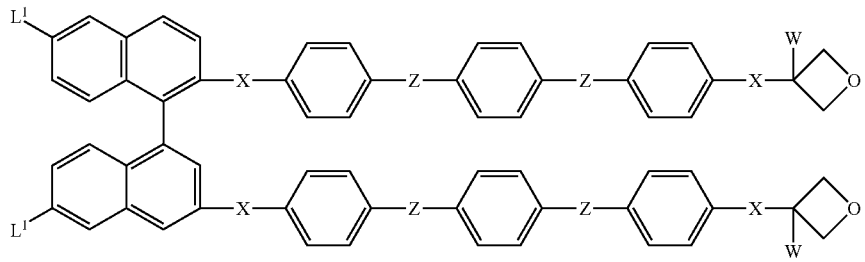
(1-8)
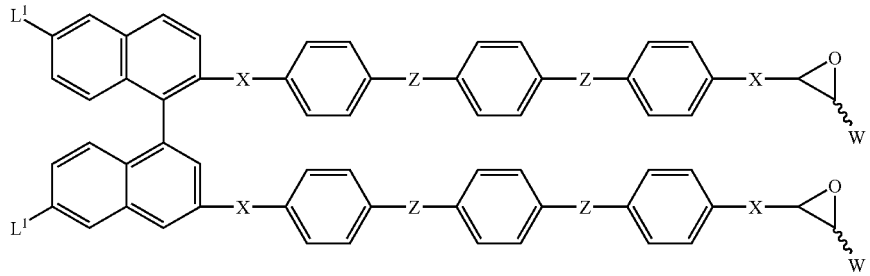
(1-9)

-continued
(1-10)
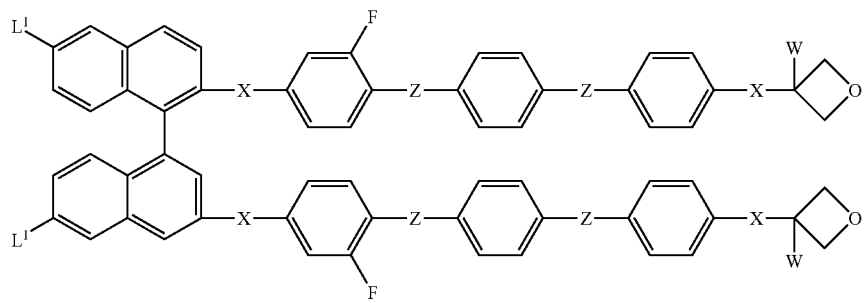
(1-11)
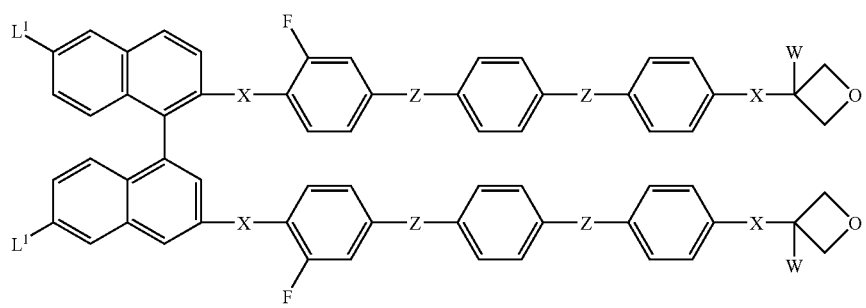
(1-12)
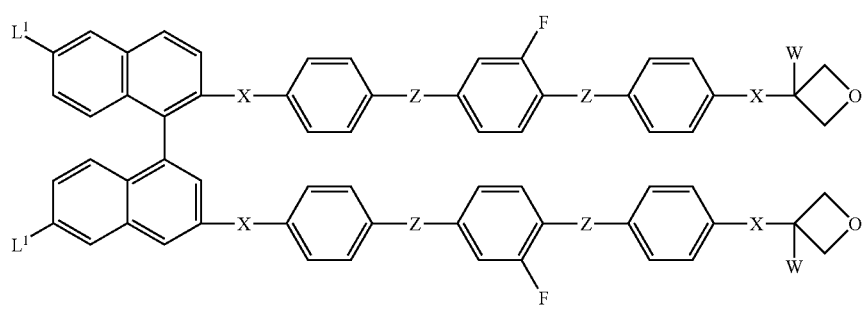
(1-13)
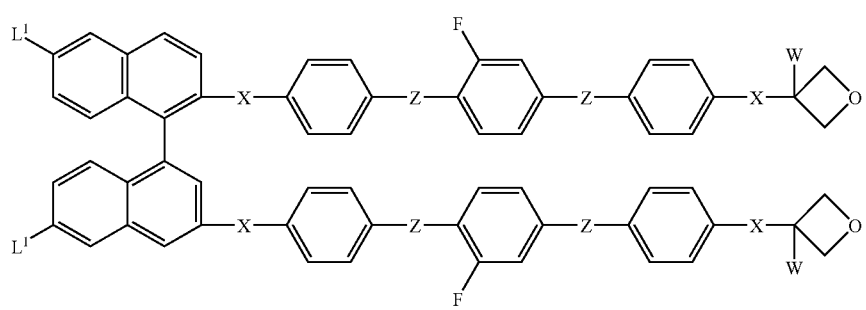
(1-14)
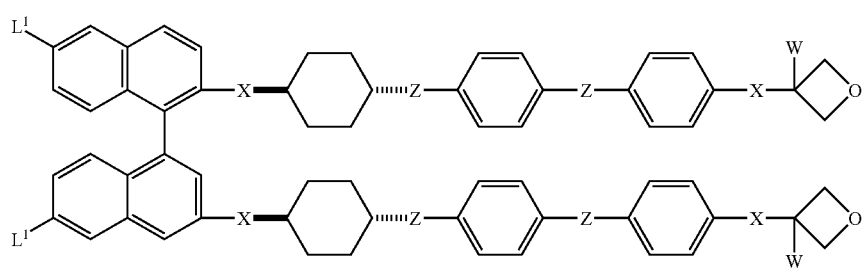

-continued
(1-15)
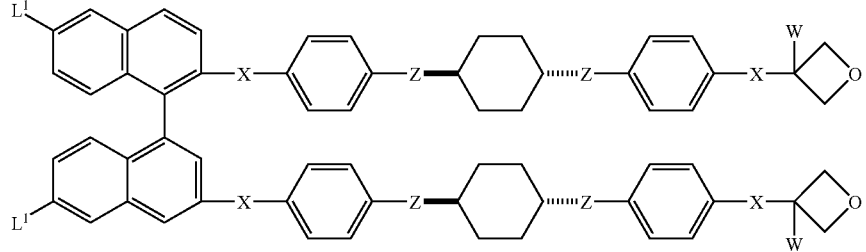
(1-16)
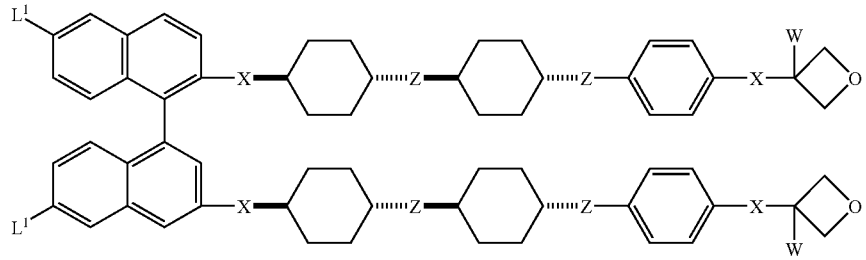
(1-17)
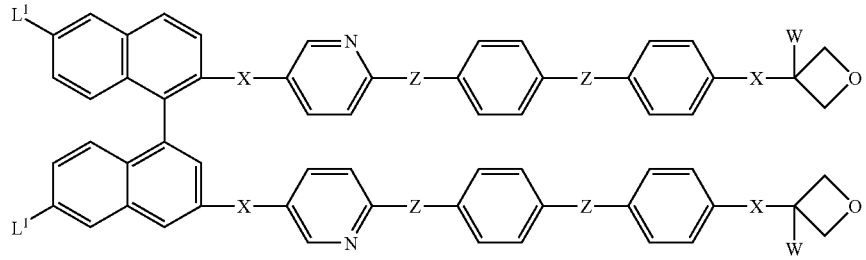
(1-18)
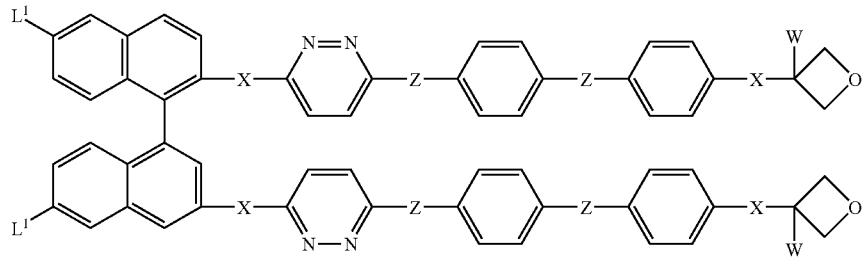
(1-19)
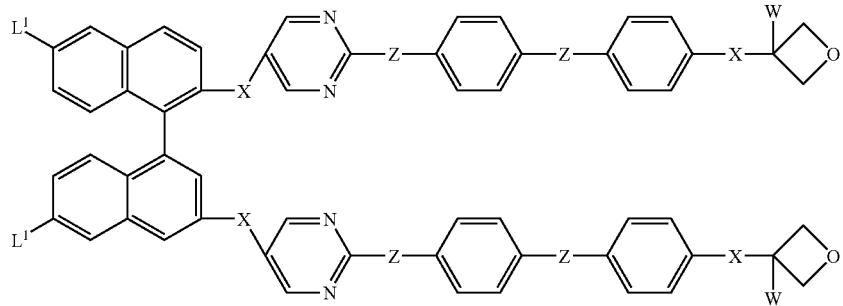

-continued
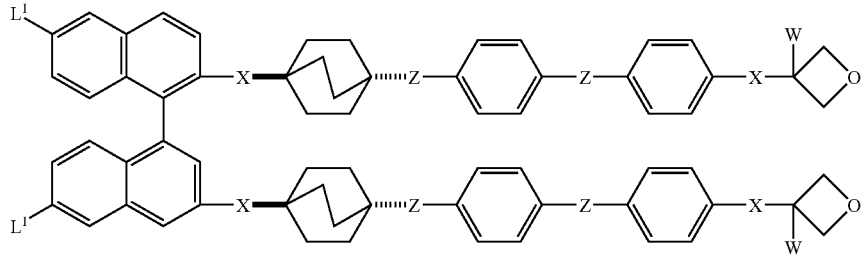
(1-20)
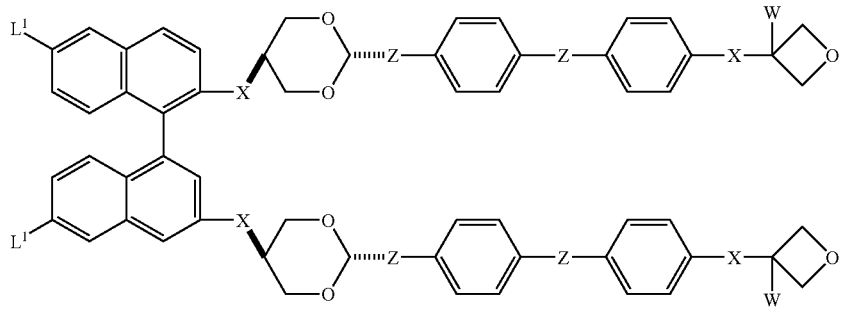
(1-21)
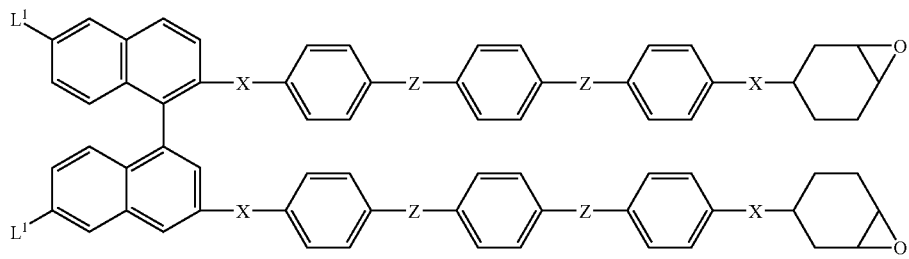
(1-22)
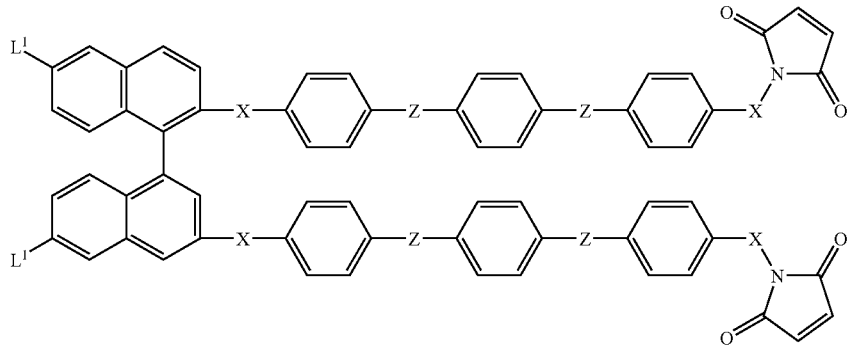
(1-23)
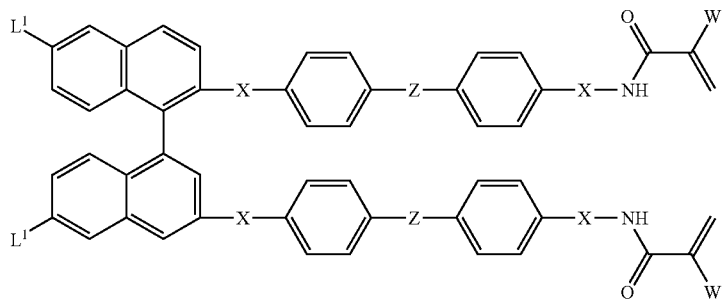
(1-24)

-continued
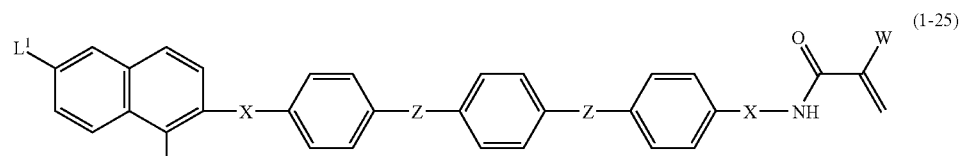
(1-25)
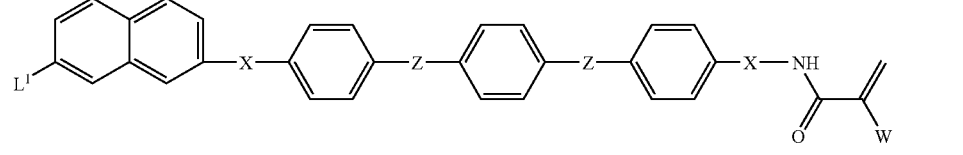
(1-26)
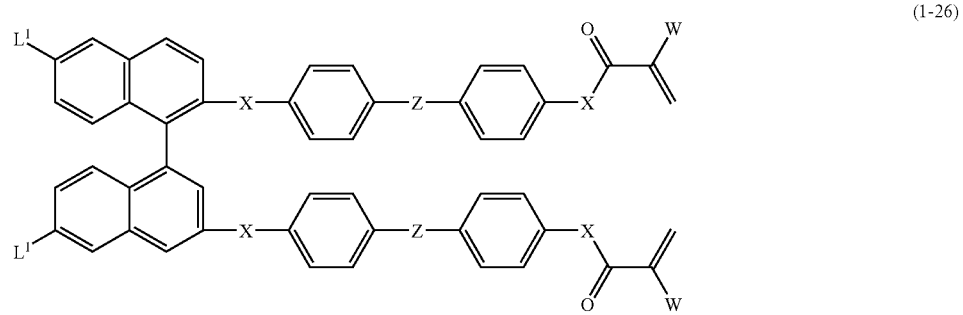
(1-27)
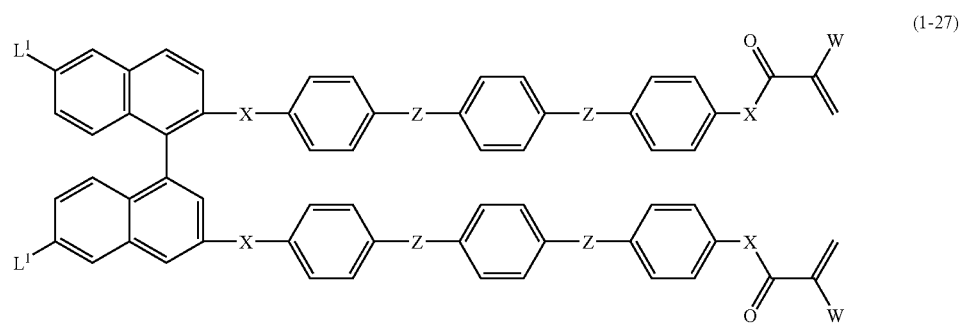
(1-28)
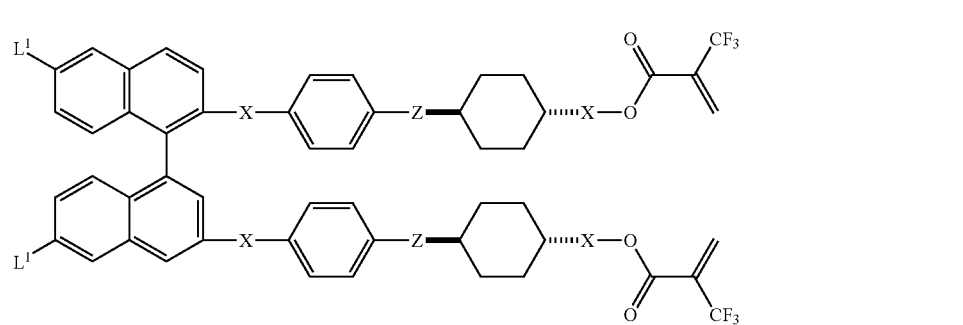
(1-29)

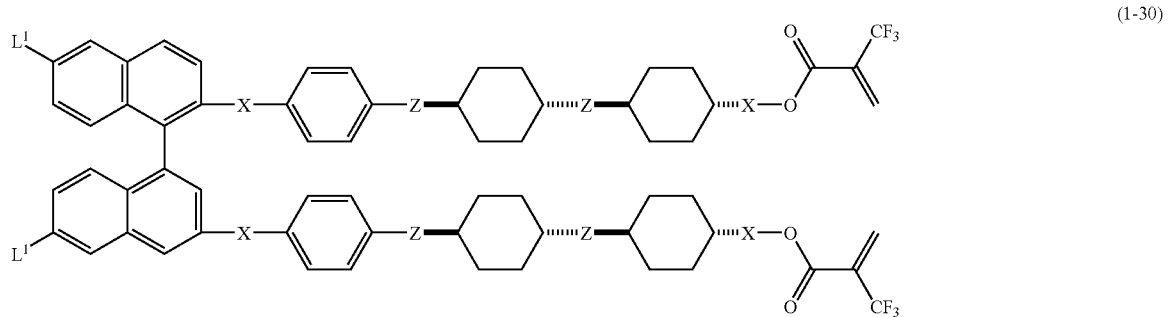
(1-30)
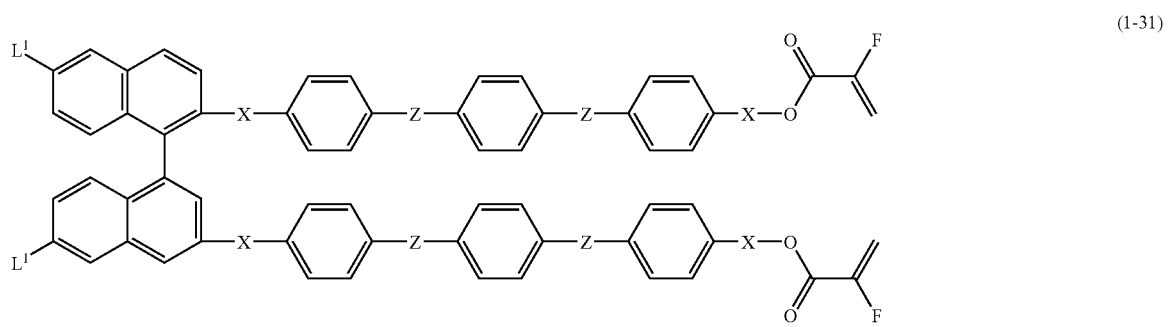
(1-31)
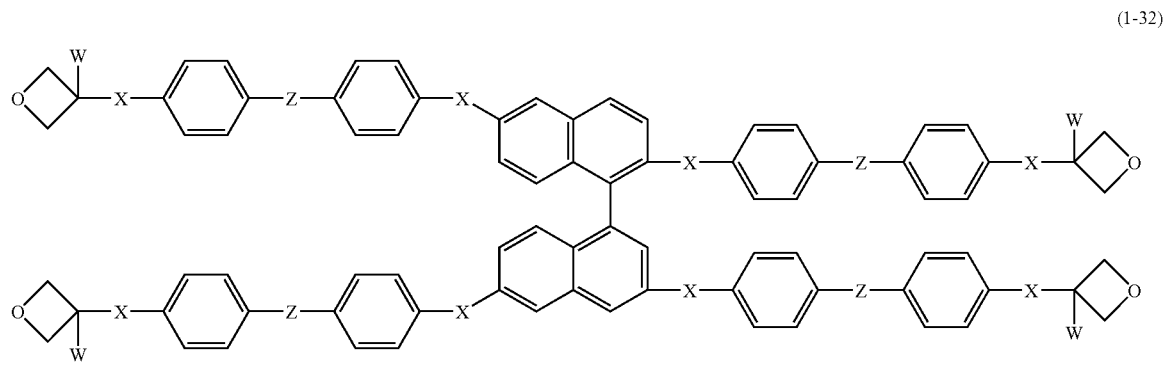
(1-32)
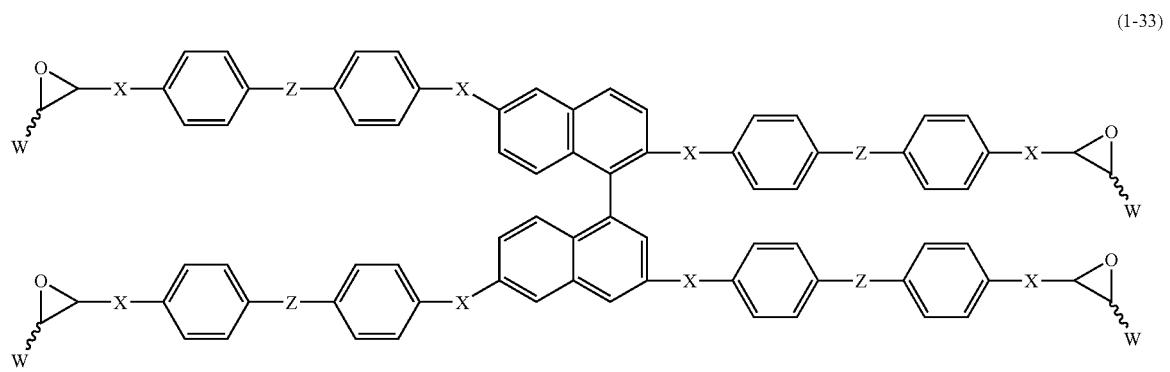
(1-33)

(1-34)

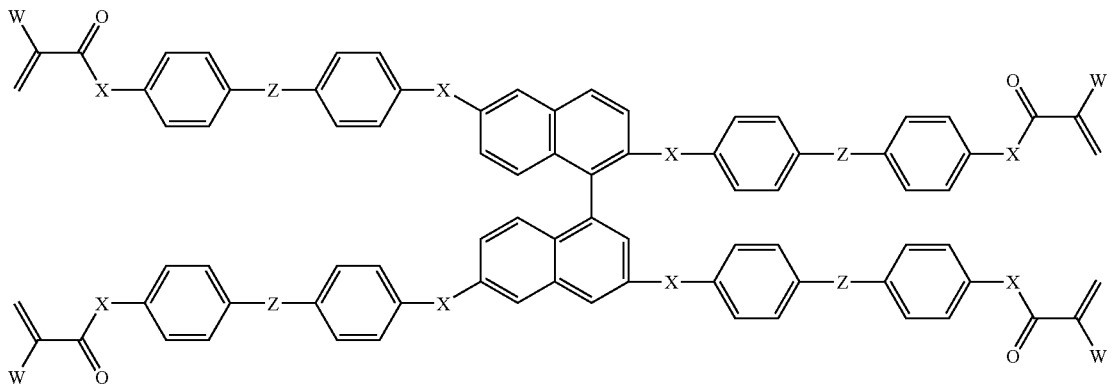

(1-35)

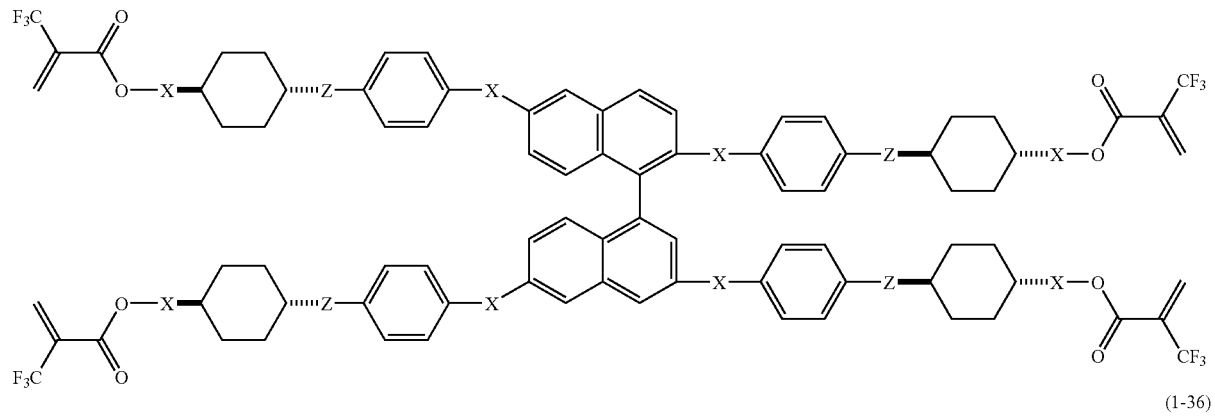

(1-36)

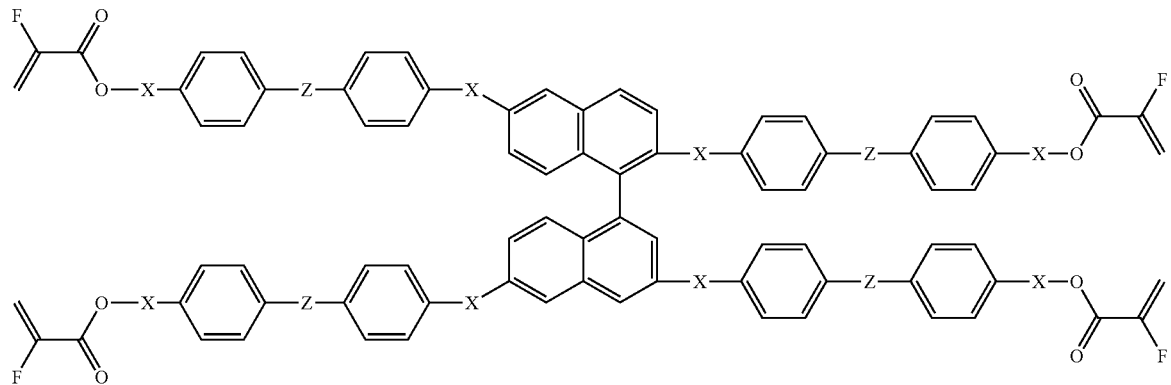

Preferably, L¹ is a hydrogen atom, a bromine atom, an alkyl group having from 1 to 10 carbon atoms, an alkoxy group having from 1 to 9 carbon atoms, or an alkoxyalkyl group having from 1 to 9 carbon atoms. More preferably, $L^1$ is a hydrogen atom or a bromine atom.

Preferably, X is a single bond, —COO—, —OCO—, or an alkylene group having from 1 to 10 carbon atoms in which any —CH$_2$— may be substituted with —O—. More preferably, X is —(CH$_2$)$_x$—, —O(CH$_2$)$_{x-1}$—, —(CH$_2$)$_{x-1}$O—, —O(CH$_2$)$_{x-y-2}$O(CH$_2$)$_y$—, or —(CH$_2$)$_y$O(CH$_2$)$_{x-y-2}$O—; x is an integer of from 1 to 10; and y is an integer of from 1 to 3.

Preferably, Z is a single bond, —COO—, —OCO—, —CH$_2$CH$_2$—, —CH$_2$O—, —OCH$_2$—, —C≡C—, —CH=CHCOO—, or —OCOCH=CH—. The linking group that links to the 1,1'-binaphthalene ring is preferably —COO—, —OCO—, —CH$_2$O—, —OCH$_2$—, —CH=CHCOO—, or —OCOCH=CH—.

Of Compounds (1-1) to (1-36), more preferred are Compounds (1-2) to (1-5), (1-8) to (1-13), (1-29) to (1-32), (1-35) and (1-36), and even more preferred are Compounds (1-2) and (1-7) to (1-11). Still more preferred are Compounds (1-2) to (1-16) in which X that links to the 1,1'-binaphthalene ring is —OCO—, X that links to the polymerizing group is —O(CH$_2$)$_x$OCH$_2$— or —O(CH$_2$)$_x$—, Z is a single bond, —OCO— or —OCOCH=CH—, W is a methyl or ethyl group. In these, x is an integer of from 2 to 10.

Especially preferred compounds (1-2a) to (1-31d) are described more concretely.

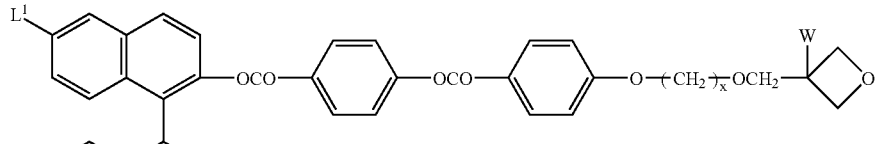
(1-2a)
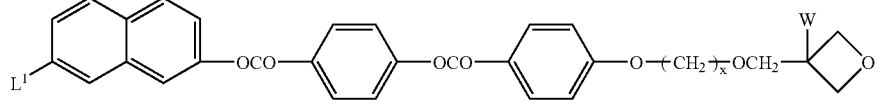
(1-3a)
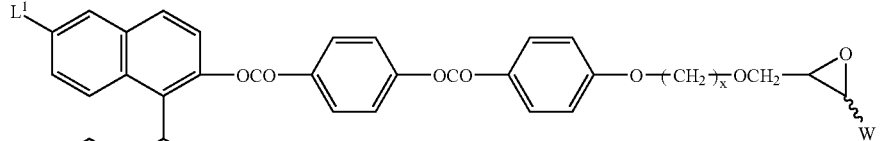
(1-3b)
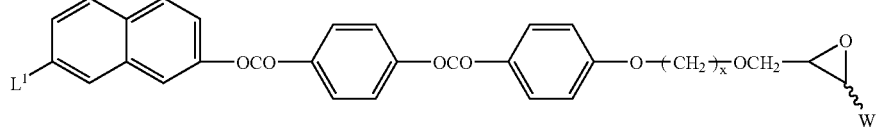
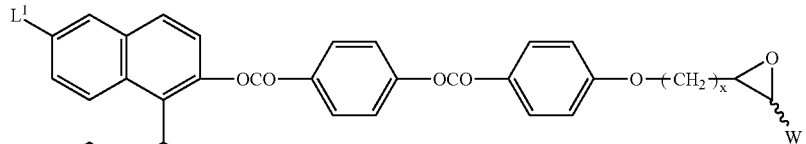
(1-8b)
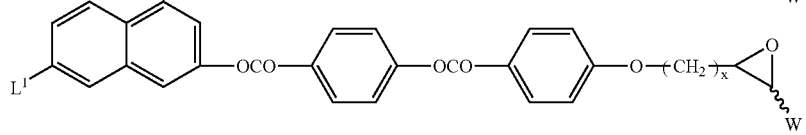
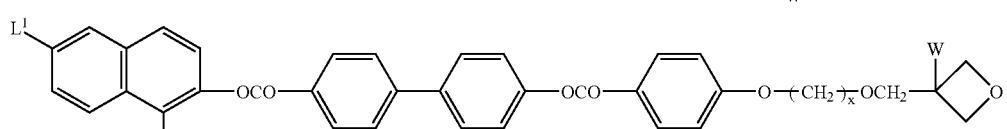
(1-9a)
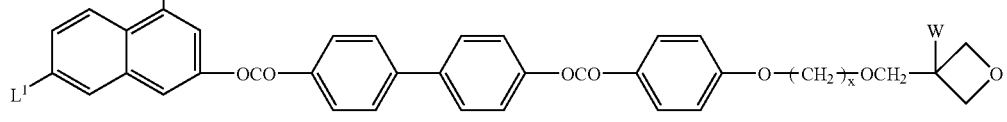
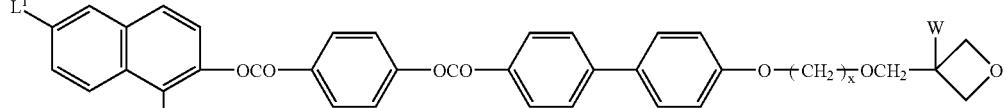
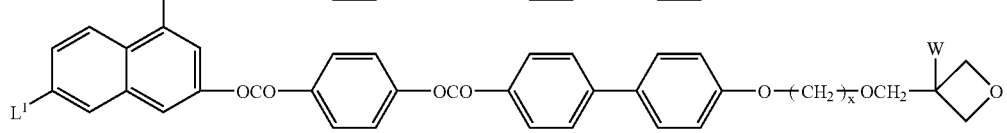
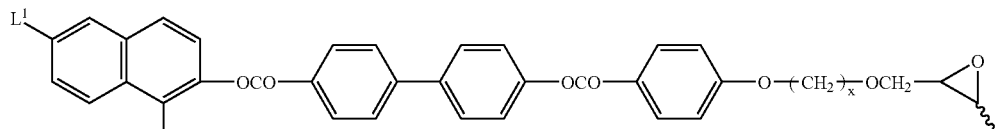
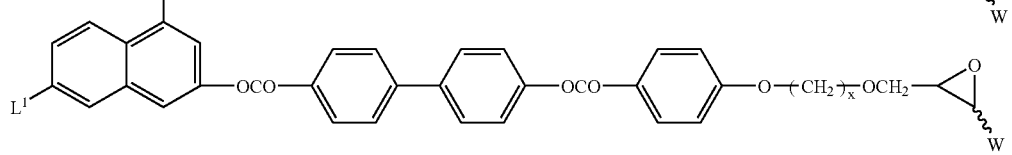

-continued
(1-9b)
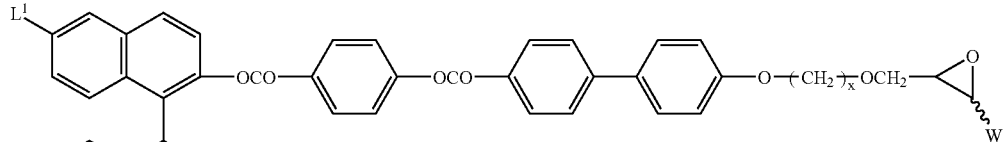
(1-9c)
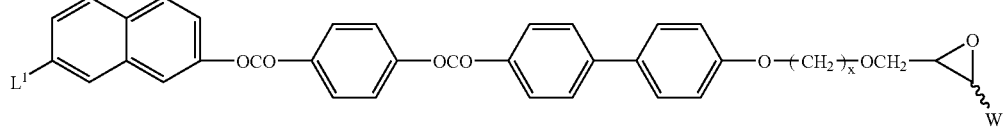
(1-9d)
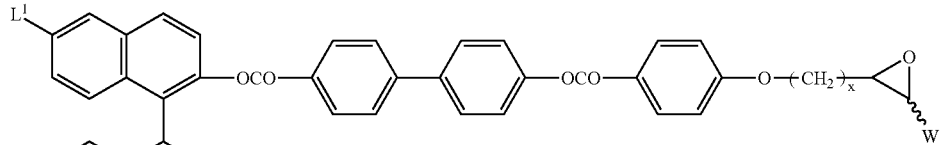
(1-14a)
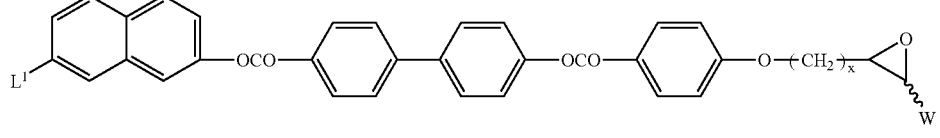
(1-14b)
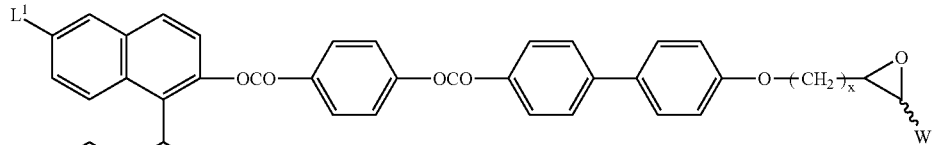
(1-15a)
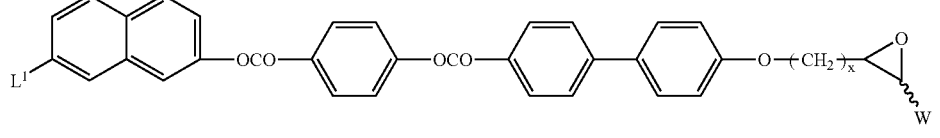

-continued
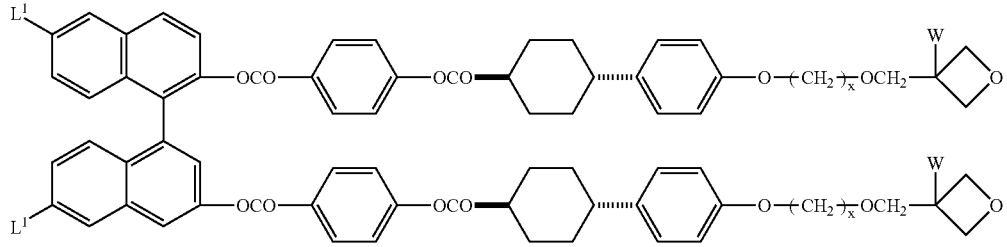
(1-15b)
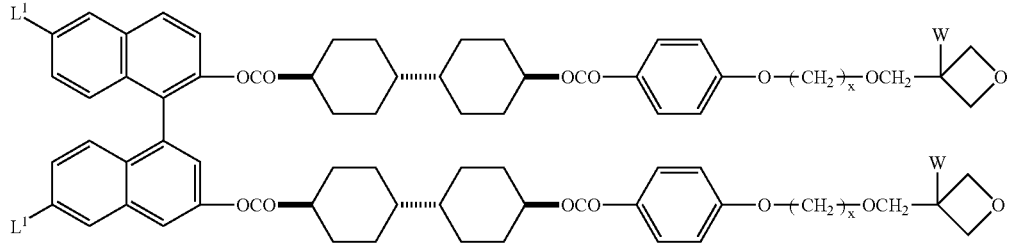
(1-16a)
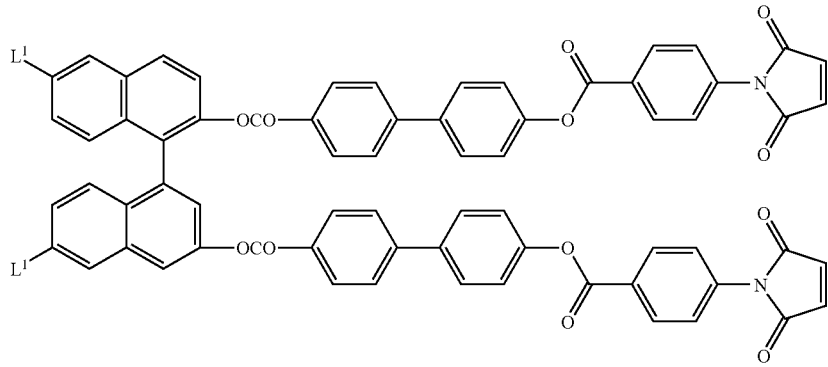
(1-23a)
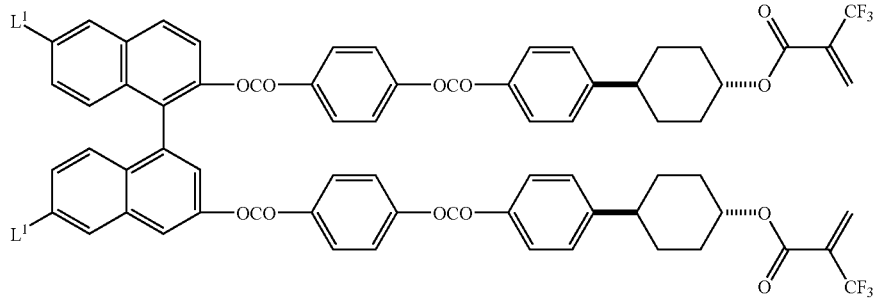
(1-29a)
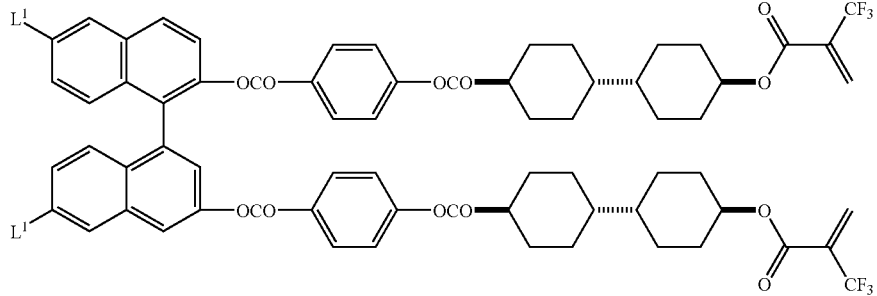
(1-30a)

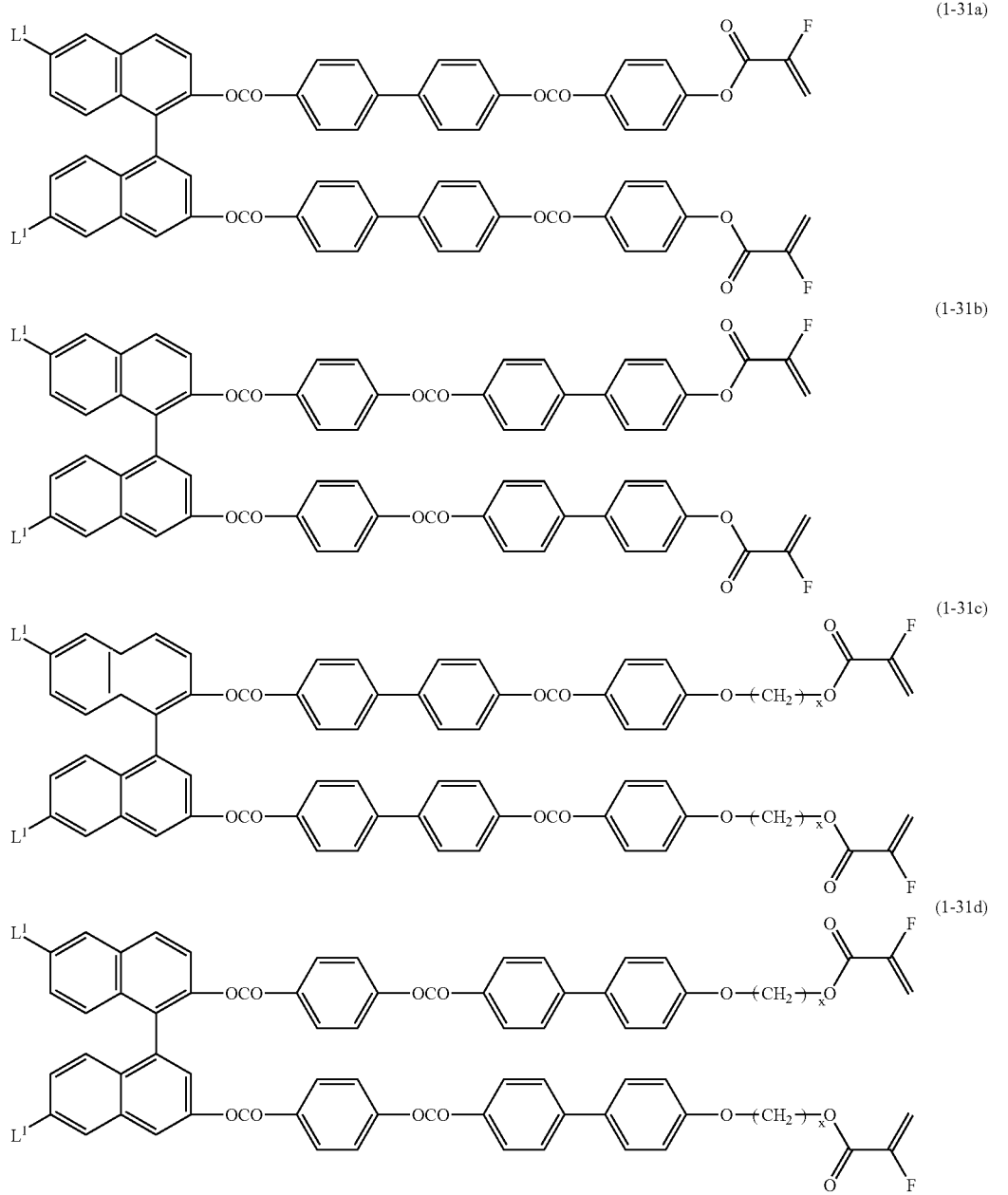

The second aspect of the invention is a liquid-crystal composition containing at least two compounds, in which at least one compound is compound (1). Preferably, the composition is a polymerizing liquid-crystal composition that contains at least one compound (1) and a monofunctional polymerizing liquid crystal or a polyfunctional polymerizing liquid crystal.

For the monofunctional polymerizing liquid crystal or the polyfunctional polymerizing liquid crystal, preferred is at least one polymerizing compound selected from compounds (M1) and (M2).

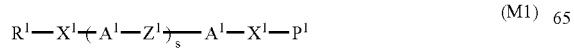  (M1)

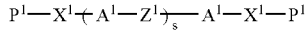  (M2)

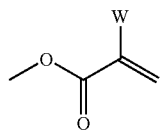  (P9)

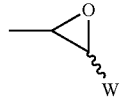  (P10)

-continued

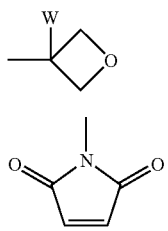

(P11)

(P12)

In formulae (M1) and (M2), $P^1$ independently represents any one polymerizing group of formulae (P9) to (P12); W represents a hydrogen atom, a halogen atom, an alkyl group having from 1 to 3 carbon atoms, or a fluoroalkyl group having from 1 to 3 carbon atoms; $R^1$ represents a hydrogen atom, a fluorine atom, a chlorine atom, —CN, or an alkyl group having from 1 to 20 carbon atoms; in the alkyl group, any —CH$_2$— may be substituted with —O—, —COO— or —OCO— and any hydrogen atom may be substituted with a halogen atom; $A^1$ independently represents a 1,4-cyclohexylene group, a 1,4-phenylene group, a 1,4-cyclohexenylene group, a pyridine-2,5-diyl group, a pyrimidine-3,5-diyl group, a naphthalene-2,6-diyl group, or a fluorene-2,7-diyl group; any hydrogen atom in these rings may be substituted with a halogen atom, an alkyl group having from 1 to 3 carbon atoms, or a halogenoalkyl group having from 1 to 3 carbon atoms; $X^1$ independently represents a single bond or an alkylene group having from 1 to 20 carbon atoms; in the alkylene group, any —CH$_2$— may be substituted with —O—, —COO— or —OCO—; $Z^1$ represents a single bond, —COO—, —OCO—, —CH$_2$CH$_2$—, —CH=CH—, —C≡C—, —CH$_2$O—, —OCH$_2$—, —CF$_2$O—, —OCF$_2$—, —CH=CHCOO— or —OCOCH=CH—; s indicates an integer of from 1 to 3; when s is 1, 2 or 3, then plural $A^1$'s may be the same or different, when s is 2 or 3, then plural $Z^1$'s may be the same or different.

Of compounds (M1) and (M2), preferred are those of the following formulae (M1a) to (M2c). Preferably, the content of the compound of formulae (M1a) to (M2c) in the liquid-crystal composition is from 10 to 99% by weight, more preferably from 50 to 95% by weight of the overall weight of the compound.

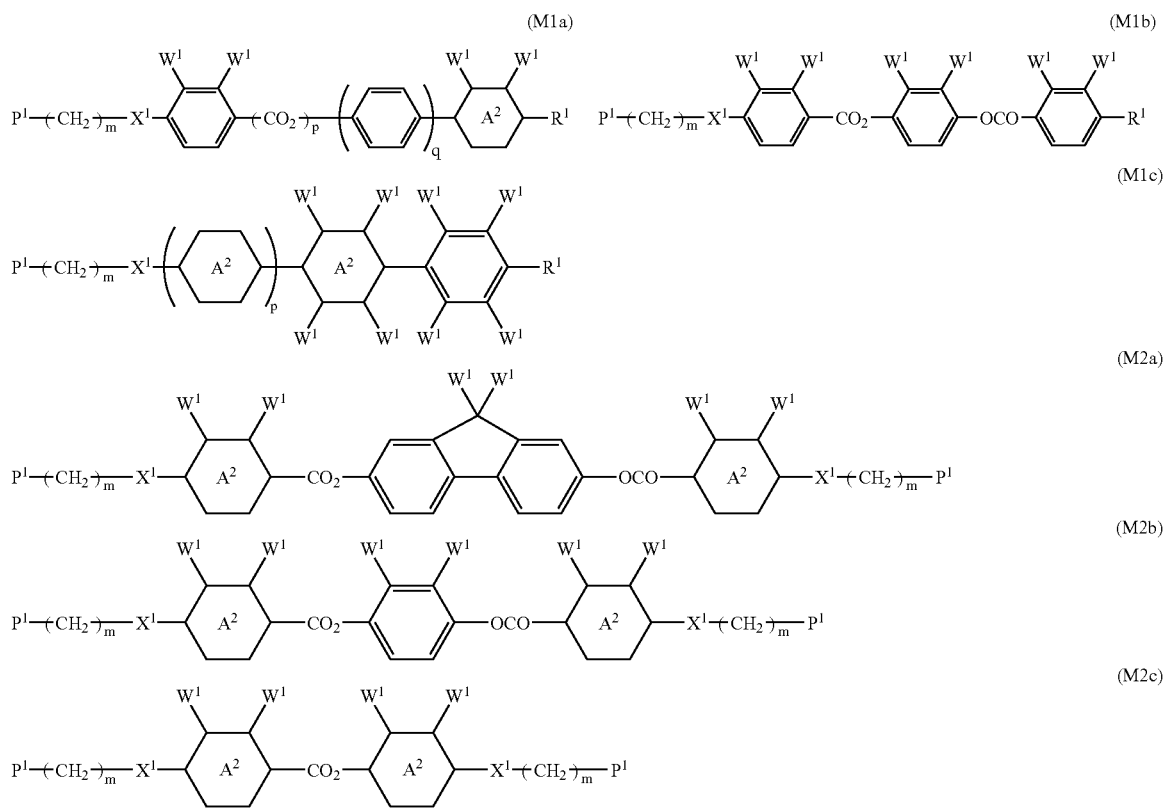

In formulae (M1a) to (M2c), $P^1$ represents any one polymerizing group of formulae (P9) to (P12); $R^1$ represents a hydrogen atom, a fluorine atom, a chlorine atom, —CN, or an alkyl group having from 1 to 20 carbon atoms; in the alkyl group, any —CH$_2$— may be substituted with —O—, —COO— or —OCO— and any hydrogen atom may be substituted with a halogen atom; the ring A2 independently represents a 1,4-cyclohexylene group or a 1,4-phenylene group; $W^1$ independently represents a hydrogen atom, a halogen atom, an alkyl group having from 1 to 3 carbon atoms, or a halogenoalkyl group having from 1 to 3 carbon atoms; $X^1$ independently represents a single bond or an alkylene group having from 1 to 20 carbon atoms; in the alkylene group, any —CH$_2$— may be substituted with —O—, —COO— or —OCO—; p and q each independently indicate 0 or 1; and m independently indicates an integer of from 0 to 5.

For improving the physical properties thereof, the composition of the invention may contain a non-polymerizing liquid-crystal compound, a non-liquid-crystalline polymerizing compound, a polymerization initiator, a solvent, a surfactant, an antioxidant, a filler, a UV absorbent, a sensitizer, etc. The chemical structure and the composition of these additives are not specifically defined. The amount of the additives is limited to that not detracting from the liquid-crystalline property of the composition. Examples of the non-polymerizing liquid-crystal compound are described in a database LiqCryst (registered trade mark, LCI Publisher, Hamburg, Germany) and in the references described therein.

For optimizing the properties of the composition, any other optically-active compound than compound (1) may be added to the composition. Preferred examples of the additional optically-active compounds are (OP-1) to (OP-25) mentioned below. In these, Ak represents an alkyl group having from 1 to 15 carbon atoms, or an alkoxy group having from 1 to 15 carbon atoms; Me, Et and Ph represent a methyl group, an ethyl group and a phenyl group, respectively. The polymerizing group $P^2$ is mentioned below, in which t indicates an integer of from 2 to 8.

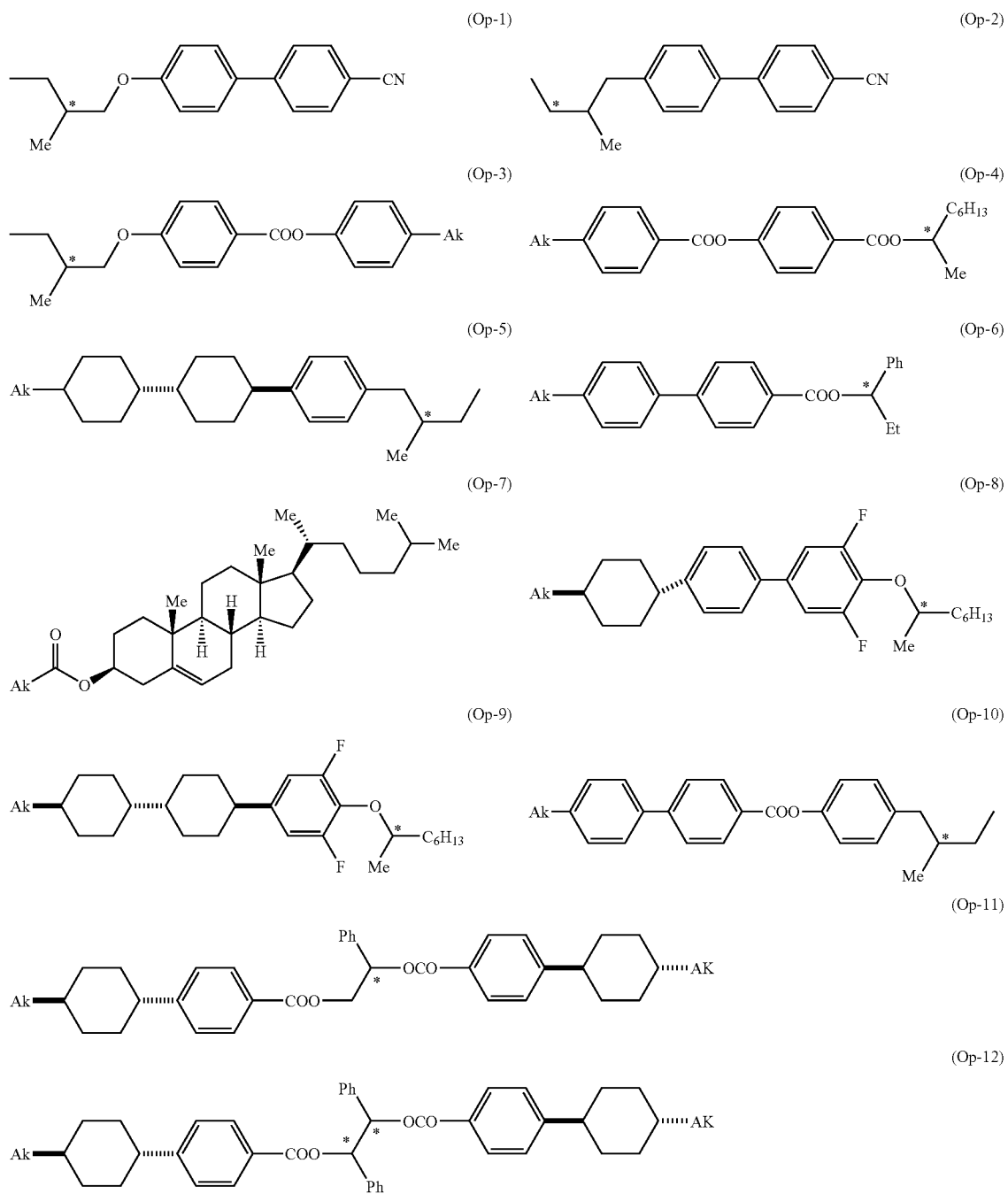

-continued
(Op-13)
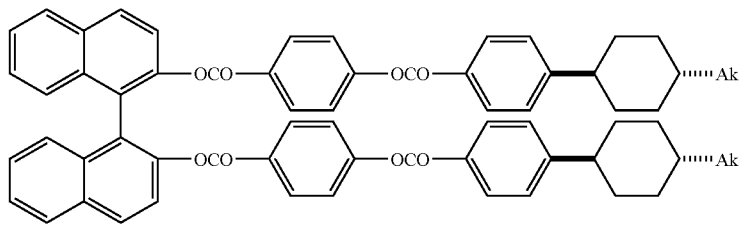
(Op-14)
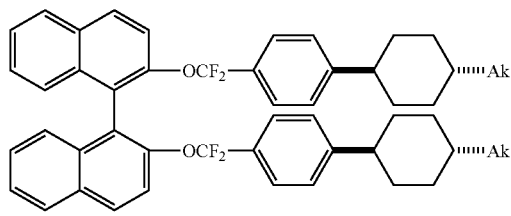
(Op-15)
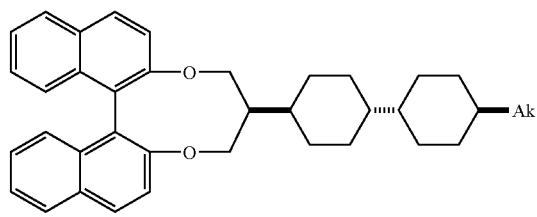
(Op-16)
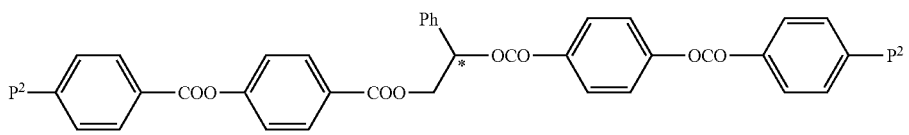
(Op-17)
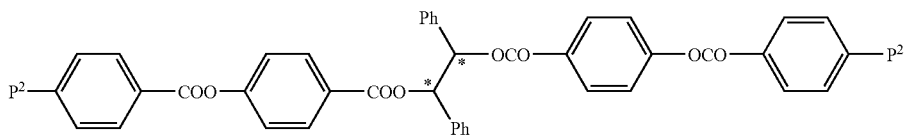
(Op-18)
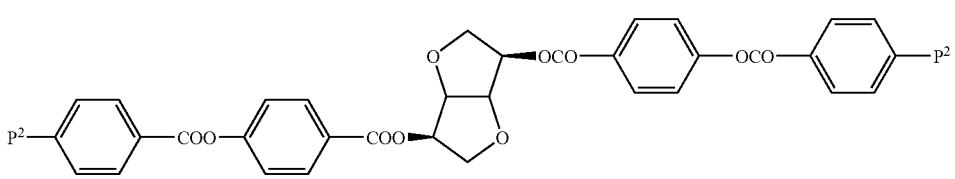
(Op-19)
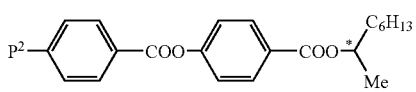
(Op-20)
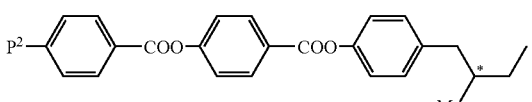
(Op-21)
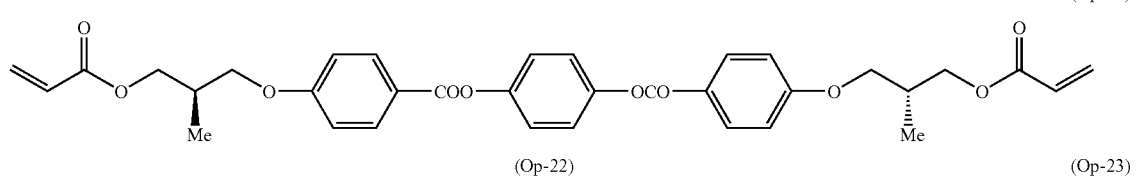
(Op-22)
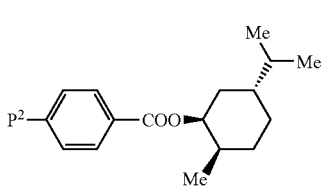
(Op-23)
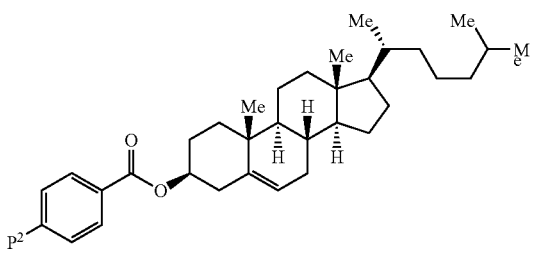

(Op-24)

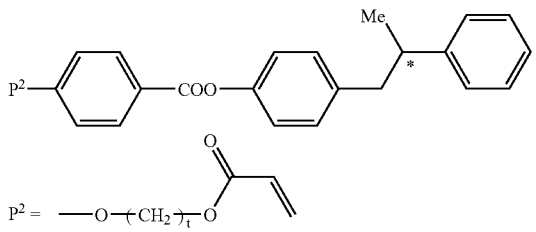

The third aspect of the invention is a polymer produced through radical polymerization or cationic polymerization of compound (1) or a liquid-crystal composition containing the compound. The polymer is a linear or side-branched polymer having a helical structure. When one compound (1) alone is polymerized, then it gives a homopolymer. When a composition containing a plurality of polymerizing compounds is polymerized, then it gives a copolymer.

A polymerizing liquid-crystal composition that contains compound (1) and a nematic liquid-crystal composition has a cholesteric phase. When the composition is applied onto a substrate to form a thin film by coating and when it is polymerized through exposure to light, then a fixed cholesteric phase (twisted orientation) can be obtained. This can be utilized for reflective polarizers, brightness-improving films, color filters, decorations, forgery prevention for ID cards and others, non-linear optical devices, optical memory devices, etc. When the pitch is distributed from short to long along the vertical direction of the substrate, then broadband reflective polarizers can be produced. The pitch distribution may be readily attained by anyone skilled in the art who refers to prior-art techniques.

The polymerization may be effected through irradiation with energy (electromagnetic waves). The electromagnetic waves include UV rays, IR rays, visible rays, X rays, γ rays, etc. In addition, high-energy beams such as ions or electrons may also be used for the irradiation.

For controlling the mechanical strength, the thermal strength, the coatability and the orientation of the composition, a polymerizing compound with no liquid crystallinity may be added to the composition. For additional compound, preferred are (meth)acrylate compounds, vinyl compounds, styrene compounds, vinyl ether compounds, oxirane compounds, and oxetane compounds. For further increasing the mechanical strength and the thermal strength of the polymer, any of poly-acrylates, vinyl ethers, oxiranes and oxetanes may also be added to the composition.

For improving the coatability and for controlling the liquid crystal orientation thereof, a surfactant may be added to the composition of the invention. The amount of the surfactant to be added may vary depending on the type and the object of the surfactant. In general, it may be from 100 ppm to 5% by weight, preferably from 100 ppm to 1% by weight of the liquid-crystal composition of the invention.

Examples of the photoradical polymerization initiator usable herein are Ciba Specialty Chemicals' Darocure series, 1173 and 4265, and Irgacure series 184, 369, 500, 651, 784, 819, 907, 1300, 1700, 1800, 1850, 2959 (all trade names). In audition, any known initiators are usable herein.

Other examples of the photoradical polymerization initiator usable herein are 4-methoxyphenyl-2,4-bis(trichloromethyl)triazine, 2-(4-butoxystyryl)-5-trichloromethyl-1,3,4- oxadiazole, 9-phenylacridine, 9,10-benzophenazine, benzophenone/Michler's ketone mixture, hexaarylbiimidazole/mercaptobenzimidazole mixture, 1-(4-isopropylphenyl)-2-hydroxy-2-methylpropan-1-one, benzyldimethyl ketal, 2-methyl-1-[4-(methylthio)phenyl]-2-morpholinopropan-1-one, 2,4-diethylxanthone/methyl p-dimethylaminobenzoate mixture, and benzophenone/methyltriethanolamine mixture. In addition, any known initiators are usable herein.

Examples of the photocationic polymerization initiator usable herein are UCC's Silacure UVI-6990 and 6974, Asahi Denka Kogyo's Adeka Optomer SP-150, 152, 170 and 172, Rhodia's Photoinitiator 2074, Ciba Specialty Chemicals' Irgacure 250, and Midori Chemical's DTS-102 (all trade names). In addition, any known initiators are usable herein.

The shaped articles of the invention can be produced by applying the compound or the composition of the invention onto a substrate to form a coating film thereon, followed by fixing the nematic orientation or the like that the composition forms in its liquid-crystalline condition, through exposure of the film to electromagnetic waves for polymerization thereof. The substrate is, for example, triacetyl cellulose, diacetyl cellulose, polyvinyl alcohol, polyimide, polyester, polyarylate, polyether-imide, polyethylene terephthalate, polyethylene naphthalate, polycarbonate, etc. For it, concretely mentioned are JSR's Arton, Nippon Zeon's Zeonex and Zeonoa, and Mitsui Chemical's Apel (all trade names). The substrate may be a uni-axially stretched film or a bi-axially stretched film. The substrate may be previously subjected to surface treatment such as saponification treatment, corona treatment or plasma treatment.

The compound or the composition of the invention may be applied to the substrate after it has been dissolved in a solvent. Preferably, the solvent is hexane, heptane, toluene, xylene, methoxybenzene, ethylene glycol dimethyl ether, ethylene glycol monomethyl ether, ethylene glycol monomethyl ether acetate, propylene glycol monomethyl ether acetate, propylene glycol monoethyl ether acetate, acetone, methyl ethyl ketone, methyl isobutyl ketone, cyclopentanone, cyclohexanone, methyl acetate, ethyl acetate, γ-butyrolactone, 2-pyrrolidone, N-methyl-2-pyrrolidone, dimethylformamide, chloroform, dichloromethane, dichloroethane, t-butyl alcohol, diacetone alcohol, butyl cellosolve, cyclopentanone or cyclohexanone, or a mixed solvent of two or more of these solvents.

For easy handling in its use and for preventing polymerization during storage, a stabilizer may be added to the compound or the composition of the invention. Any known stabilizer may be used. For example, it includes 4-ethoxyphenol, hydroquinone, 3,5-di-t-butyl-4-hydroxytoluene (BHT).

The compound or the composition of the invention may be applied onto the substrate in any method of spin coating, roll coating, curtain coating, flow coating, printing, microgravure coating, gravure coating, wire bar coating, dipping, spraying, meniscus coating or casting to form a thin film thereon, and the solvent may be removed from the film.

When the substrate is subjected to orientation treatment before coated with it, then the compound or the composition of the invention may be oriented on the substrate. For the orientation treatment of the substrate, for example, employable is a method of forming a thin film of polyimide, polyamide or polyvinyl alcohol and rubbing it with a rayon cloth; a method of depositing silicon oxide on the film in a mode of oblique vapor deposition; and a method of rubbing-free orientation of using a stretched film, an optically-oriented film or ionic beams. Apart from these, the substrate may be directly rubbed with a rayon cloth or the like. In some cases, the substrate may not be subjected to surface treatment.

The orientation of the compound or the composition of the invention may be fixed through irradiation with electromagnetic waves. Preferably, the wavelength of the electromagnetic waves is at least 300 nm, more preferably 365 nm. The temperature for the irradiation may be a temperature at which the compound or the composition is in a liquid-crystal condition. For preventing thermal polymerization, however, the temperature is preferably not higher than 100° C. An optical device having a helical pitch selectively reflects right-handed or left-handed circularly-polarized light. When the wavelength of the light to be reflected falls between 350 and 750 nm, then the optical device selectively reflects the circularly-polarized light within a visible light region of the incident light. When the wavelength of the light to be reflected falls between 100 and 350 nm, then the device transmits the light that falls within a visible light region and has entered the device from its front side, and therefore, the device can be used as a negative-type C-plate. Specifically, when the optical device is sandwiched between two polarizers as a cross-Nicol, then light transmission could not be attained in the front direction but light may transmit in the oblique direction. Since the wavelength of the light to be reflected is equal to the product of the refractive index and the helical pitch of the optical device, it is possible to optimize in any desired manner the wavelength of the light for selective reflection by controlling the refractive index and the helical pitch of the optical device.

The composition of the invention than contains an optically-active compound shows a helical structure on a substrate. When the composition is polymerized, then a shaped article having twisted orientation can be produced. For the light having a wavelength ($\lambda$) that satisfies a formula "$\lambda$=refractive index×helical pitch", the shaped article has a circularly-polarized light separation function. This can be used as a brightness-improving film. By suitably selecting and determining the type and the amount of the optically-active compound to be in the composition, the helical direction and the helical pitch can be optimized. When a negative-type C-plate is produced, the wavelength of the selective reflected light must be shorter than 350 nm. For this, the helical pitch is preferably smaller than 200 nm. When it is smaller than 200 nm, it gives negative-type C-plates in every case. However, for obtaining shorter helical pitch, the composition requires a larger amount of the binaphthalene derivative. In consideration of the temperature range of the liquid-crystal phase to be kept as it is, it is desirable that the amount of the binaphthalene derivative to be in the composition is as small as possible. Accordingly, the preferred helical pitch is from 1 nm to less than 200 nm, more preferably from 10 nm to less than 200 nm, even more preferably from 50 nm to less than 200 nm, still more preferably from 50 nm to less than 150 nm.

The thickness of the shaped article of the invention varies, depending on the necessary properties and the optical anisotropy thereof. Preferably, the optical anisotropy of the shaped article falls between 0.05 and 50 µm, more preferably between 0.1 and 20 µm, even more preferably between 0.5 and 1 µm. Also preferably, the retardation of the shaped article falls between 0.05 and 50 µm, more preferably between 0.1 and 20 µm, even more preferably between 0.5 and 10 µm. Also preferably, the haze of the shaped article is at most 1.5%, more preferably at most 1.0%. Also preferably, the transmission in the visible light region of the shaped article is at least 80%, more preferably at least 85%. For satisfactory polarization capability thereof, it is desirable that the shaped article has a haze of at most 1.5%. The transmittance of at least 80% of the shaped article is one preferred condition for good brightness when the shaped article is used in liquid-crystal display devices.

The thermoplastic polymer of the invention may be utilized for adhesives, synthetic polymers having mechanical anisotropy, cosmetics, decorations, forgery-preventing devices, non-linear optical materials and information memory materials. This is a linear polymer in which the branched structure is small, and this is obtained from a monofunctional compound or from a composition of essentially the compound. Preferably, the polymer of the type has a weight-average molecular weight of from 500 to 1,000,000, more preferably from 1,000 to 500,000, even more preferably from 5,000 to 100,000.

The thermosetting polymer of the invention may be utilized for polarizers, optical compensators, brightness-improving films, and negative C-plates, applied to liquid-crystal display devices. The polymer has a three-dimensional network structure, and is obtained by polymerizing a polyfunctional compound or a composition of essentially the compound. The polymer has a high degree of polymerization. The polymer is hardly soluble in solvent, and has a high hardness. The molecular weight of the polymer is difficult to measure, and could not be defined herein. Preferably, the molecular weight of the polymer is up to infinity.

The invention is described in detail with reference to the following Examples. The phase transition temperature is determined by DSC and the use of a melting point analyzer (a hot stage) fitted with a polarizing microscope. The chemical structure of the produced compounds is confirmed through $^1$H-NMR and $^{13}$C-NMR. C, N, Ch, and I mean a crystal, a nematic phase, a cholesteric phase and an isotropic liquid, respectively. For example, the expression of "C 100.0 Ch" means that the phase transition temperature from crystal to cholesteric phase is 100.0° C. HTP is calculated as follows: A compound (1) is added to the base liquid crystal ZLI-1132, and the pitch of the resulting cholesteric liquid-crystal composition is measured at 25° C. HTP=$p^{-1} \times c^{-1}$, in which c indicates the concentration (wt. %) of the compound (1) and p indicates the pitch (µm).

The adhesiveness of the polymer obtained is confirmed in an adhesive cellophane tape-peeling test. The adhesive cellophane tape-peeling test is a test method in JIS Standards, JIS-5400, in which the adhesiveness of the sample tested is evaluated from the number of the remaining cross-cuts of 100 cross-cuts made in total. In the following, "liter" as the unit of a volume is represented by a symbol, L.

EXAMPLE 1

Production of (R)-2,2'-bis[4-[4-[6-(3-ethyloxetan-3-ylmethyloxy)hexyloxy]benzoyloxy]benzoyloxy-1,1'-binaphthalene [compound of formula (1-2) in which $L^1$ is a hydrogen atom, X linking to the 1,1'-binaphthalene ring is —OCO—, Z is —OCO—, X linking to the polymerizing group is —O(CH$_2$)$_6$OCH$_2$—, and W is an ethyl group]:

A mixture of (R)-2,2'-dihydroxy-1,1'-binaphthalene (10 g, 34.9 mmol), 4-benzyloxybenzoic acid (23.9 g, 105 mmol), dicyclohexylcarbodiimide (21.7 g, 105 mmol), 4-dimethylaminopyridine (12.8 g, 105 mmol) and dichloromethane (300 mL) was stirred at room temperature for 2 hours. The precipitated insoluble was removed through filtration, and the filtrate was concentrated. The residue was purified through column chromatography (silica gel: 700 mL, eluent: toluene) to obtain 17.1 g (yield 69%) of (R)-2,2'-bis(4-benzyloxybenzoyloxy)-1,1'-binaphthalene as a colorless crystals. Its $^1$H-NMR and $^{13}$C-NMR well supported its structure. Rf=0.42.

A mixture of (R)-2,2'-Bis(4-benzyloxybenzoyloxy)-1,1'-binaphthalene (17 g, 24.1 mmol), 5% PdC (10 g) and ethanol/toluene (300 mL/300 mL) was stirred in a hydrogen atmosphere for 3 hours. The catalyst was removed through filtration, and the filtrate was concentrated. The residue was purified through column chromatography (silica gel: 2 L, eluent: toluene/ethyl acetate (1/1)) to obtain 13.8 g (yield 99%) of (R)-2,2'-bis(4-hydroxybenzoyloxy)-1,1'-binaphthalene as a colorless crystalls. Its $^1$H-NMR and $^{13}$C-NMR well supported its structure. Rf=0.60.

A mixture of (R)-2,2'-Bis(4-hydroxybenzoyloxy)-1,1'-binaphthalene (5.0 mg, 9.5 mL), 4-[6-(3-ethyloxetan-3-ylmethyloxy)hexyloxy]benzoic acid (7.7 mg, 22.8 mmol), dicyclohexylcarbodiimide (4.7 g, 22.8 mmol), 4-dimethylaminopyridine (0.7 mg, 5.7 mmol) and dichloromethane (100 mL) was stirred at room temperature for 2 hours. The precipitated insoluble was removed through filtration, and the filtrate was concentrated. The residue was purified through column chromatography (silica gel: 1 L, eluent: ethyl acetate/toluene (3/7)) to obtain 7.3 g (yield 58%) of (R)-2,2'-bis[4-[4-[6-(3-ethyloxetan-3-ylmethyloxy)hexyloxy]benzoyloxy]benzoyloxy-1,1'-binaphthalene as a colorless viscous oil. Its $^1$H-NMR and $^{13}$C-NMR well supported its structure. Rf=0.65.

EXAMPLE 2

Production of (R)-2,2'-bis[4-[4-[6-(3-ethyloxetan-3-ylmethyloxy)hexyloxy]benzoyloxy]-1,1'-biphenyl-4'-carbonyloxy]-1,1'-binaphthalene [compound of formula (1-8) in which $L^1$ is a hydrogen atom, X linking to the 1,1'-binaphthalene ring is —OCO—, the left-handed Z is a single bond, the right-handed Z is —OCO—, X linking to the polymerizing group is —O(CH$_2$)$_6$OCH$_2$—, and W is an ethyl group]:

According to the same process as in Example 1 except that 4-benzyloxy-1,1'-biphenyl-4'-carboxylic acid was used in place of 4-benzyloxybenzoic acid, (R)-2,2'-bis[4-[4-[6-(3-ethyloxetan-3-ylmethyloxy)hexyloxy]benzoyloxy]-1,1'-biphenyl-4'-carbonyloxy]-1,1'-binaphthalene was obtained as a colorless amorphous solid.

EXAMPLE 3

Production of (S)-6,6'-dibromo-2,2'-bis[4-[4-(2-oxiranylethoxy)benzoyloxy]-1,1'-biphenyl-4'-carbonyloxy]-1,1'-binaphthalene [compound of formula (1-9c) in which $L^1$'s are both bromine atoms, x is 2 and W is a hydrogen atom]:

According to the same process as in Example 1 except that (S)-6,6'-dibromo-2,2'-dihydroxy-1,1'-binaphthalene was used in place of (R)-2,2'-dihydroxy-1,1'-binaphthalene and 4-(2-oxiranylethoxy)benzoic acid was used in place of 4-[6-(3-ethyloxetan-3-ylmethyloxy)hexyloxy]benzoic acid, (S)-6,6'-dibromo-2,2'-bis[4-[4-(2-oxiranylethoxy)benzoyloxy]-1,1'-biphenyl-4'-carbonyloxy]-1,1'-binaphthalene was obtained as a colorless crystal.

EXAMPLE 4

Production of (R)-6,6'-Bis[6-[4-(4-pentylcyclohexyl)phenyloxy]hexyl]-2,2'-bis[4-[4-[6-(3-ethyloxetan-3-ylmethyloxy)hexyloxy]benzoyloxy]benzoyloxy]-1,1'-binaphthalene [compound of formula (1) in which $Q^1$ and $Q^2$ are both 6-[4-(4-pentylcyclohexyl)phenyloxy]hexyl, $Q^3$ and $Q^4$ are both formula (2), the left-sided X is —OCO—, n is 1, A's are both 1,4-phenylene, Z is —OCO—, and —X—P is 6-[3-ethyloxetan-3-ylmethyloxy]hexyloxy]:

According to the same process as in Example 1 except that (R)-6,6'-bis[6-[4-(4-pentylcyclohexyl)phenyloxy]hexyl]-2,2'-dihydroxy-1,1'-binaphthalene was used in place of (R)-2,2'-dihydroxy-1,1'-binaphthalene, (R)-6,6'-bis[6-[4-(4-pentylcyclohexyl)phenyloxy]hexyl]-2,2'-bis[4-[4-[6-(3-ethyloxetan-3-ylmethyloxy)hexyloxy]benzoyloxy]benzoyloxy]-1,1'-binaphthalene was produced. (R)-6,6'-bis[6-[4-(4-pentylcyclohexyl)phenyloxy]hexyl]-2,2'-dihydroxy-1,1'-binaphthalene was produced according to the method described in *Mol. Cryst. Liq. Cryst.*, 2001, 364, 825.

EXAMPLE 5

Preparation of Photopolymerizing Liquid-crystal Composition (Mix-1) and Production of Optical Thin Film:

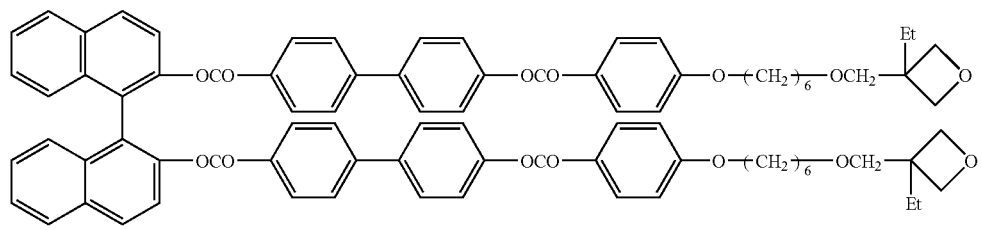

(Ex-2)

-continued

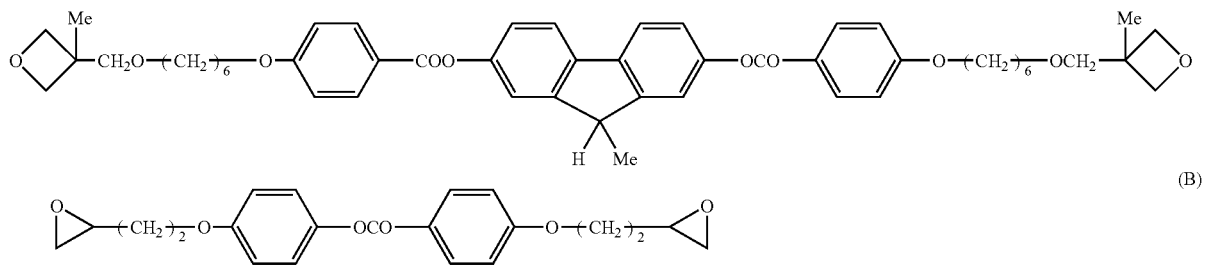

A liquid-crystal composition (Mix-1) was prepared, comprising the compound obtained in Example 2 (hereinafter referred to as (Ex-2)) [10 parts by weight], compound (A) [45 parts by weight] and compound (B) [45 parts by weight] Compounds (A) and (B) were produced according to the method described in Japanese Patent Application No. 2003-203629 and the method described in *Macromolecules*, 1993, 26(6), 244, respectively.

A mixed solvent of cyclopentanone/toluene (1:2) (3.0 g) and DTS-102 (10 mg) were added to the composition (Mix-1) [1.0 g] to prepare a solution having a ratio of the polymerizing liquid-crystal composition to the polymerization initiator of about 98 parts by weight to 2 parts by weight. Using a spin coater (2000 rpm), the resulting solution was applied onto a saponified triacetyl cellulose film of which the surface had been rubbed with a rayon cloth. This was left on a hot plate at 70° C. for 3 minutes to remove the solvent, and the liquid-crystal phase was thereby oriented. This was restored to room temperature, and exposed to UV rays from a high-pressure mercury lamp (120 W/cm) for 30 seconds, and a colorless transparent optical thin film was thus obtained. The transmission spectrum through the thus-obtained optical thin film was analyzed, and it confirmed the absence of selective reflection at 350 nm or more. The effective retardation at 550 nm was analyzed. In vertical light introduction, it was 0 nm, and when the light introduction was inclined at an angle of 40° from the normal line of the film face, it was −35 nm. This confirmed that the optical film served as a negative C-plate. In a heat-resistance test (100° C., 1000 hours), the optical film had a retardation change of less than 3%. In an adhesion strength test, the number of the remaining cross cuts was 100, and this confirmed good adhesion of the film.

EXAMPLE 6

Preparation of Photopolymerizing Liquid-crystal Composition (Mix-2) and Production of Optical Thin Film:

A liquid-crystal composition (Mix-2) was prepared, comprising the compound obtained in Example 2 (Ex-2) [5 parts by weight], compound (A) (47.5 parts by weight] and compound (B) [47.5 parts by weight].

A mixed solvent of cyclopentanone/toluene (1:2) (3.0 g) and DTS-102 (30 mg) were added to the composition (Mix-2) [1.0 g] to prepare a solution having a ratio of the polymerizing liquid-crystal composition to the polymerization initiator of about 97 parts by weight to 3 parts by weight. Using a spin coater (2000 rpm), the resulting solution was applied onto a saponified triacetyl cellulose film of which the surface had been rubbed with a rayon cloth. This was left on a hot plate at 70° C. for 3 minutes to remove the solvent, and the liquid-crystal phase was thereby oriented. This was restored to room temperature, and exposed to UV rays from a high-pressure mercury lamp (120 W/cm) for 30 seconds, and an optical thin film was thus obtained. This showed blue selective reflection.

EXAMPLE 7

Preparation of Photopolymerizing Liquid-crystal Composition (Mix-3) and Production of Optical Thin Film:

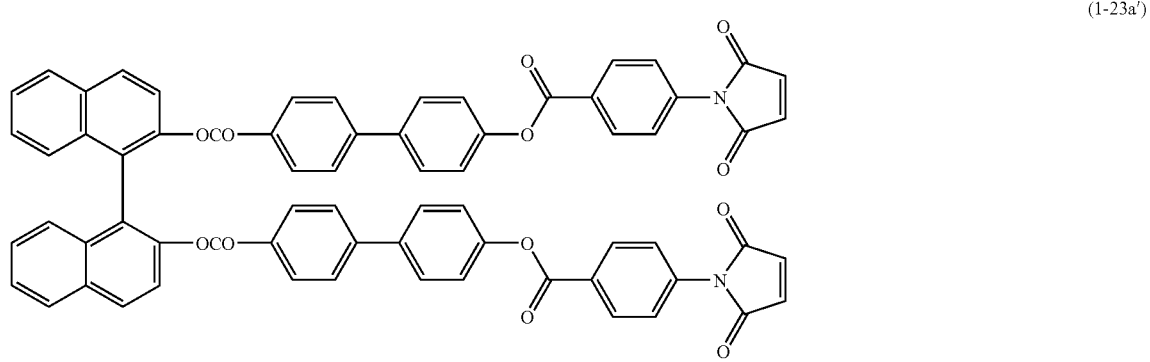

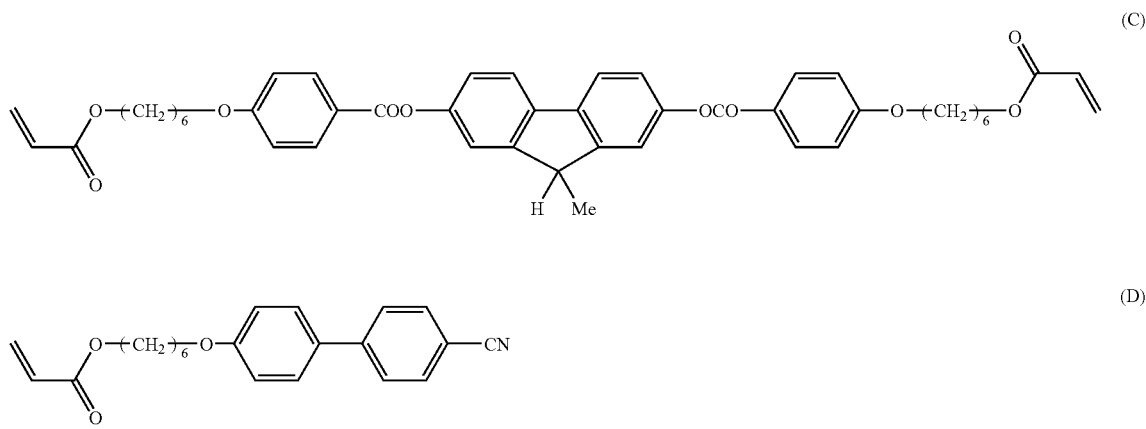

A liquid-crystal composition (Mix-3) was prepared, comprising compound (1-23a') [compound of formula (1-23a) in which $L^1$'s are both hydrogen atoms; 10 parts by weight], compound (C) [60 parts by weight] and compound (D) [20 parts by weight]. Compounds (C) and (D) were produced according to the method described in Japanese Patent Application No. 2002-317433 and the method described in JP-A 61-064493, respectively.

In the same manner as in Example 6 except that the composition (Mix-3) was used in place of the composition (Mix-2), a colorless transparent optical thin film was obtained. The transmission spectrum through the thus-obtained optical thin film was analyzed, and it confirmed the absence of selective reflection at 350 nm or more. The effective retardation at 550 nm was analyzed. In vertical light introduction, it was 0 nm, and when the light introduction was inclined at an angle of 40° from the normal line of the film face, it was -25 nm. This confirmed that the optical film served as a negative C-plate.

EXAMPLE 8

Preparation of Photopolymerizing Liquid-crystal Composition (Mix-4) and Production of Optical Thin Film:

In the same manner as in Example 7 except that compound (1-29a') [compound of formula (1-29a) in which $L^1$'s are both hydrogen atoms; 15% by weight] was used in place of the compound (1-23a') [10% by weight], a colorless transparent optical thin film was obtained. The transmission spectrum through the thus-obtained optical thin film was analyzed, and it confirmed the absence of selective reflection at 350 nm or more. The effective retardation at 550 nm was analyzed. In vertical light introduction, it was 0 nm, and when the light introduction was inclined at an angle of 40° from the normal line of the film face, it was -27 nm. This confirmed that the optical film served In the same manner as in Example 7 except that compound (1-29a') [compound of formula (1-29a) in which $L^1$'s are both hydrogen atoms; 15% by weight] was used in place of the compound (1-23a') [10% by weight], a colorless transparent optical thin film was obtained. The transmission spectrum through the thus-obtained optical thin film was analyzed, and it confirmed the absence of selective reflection at 350 nm or more. The effective retardation at 550 nm was analyzed. In vertical light introduction, it was 0 nm, and when the light introduction was inclined at an angle of 40° from the normal line of the film face, it was -27 nm. This confirmed that the optical film served as a negative C-plate.

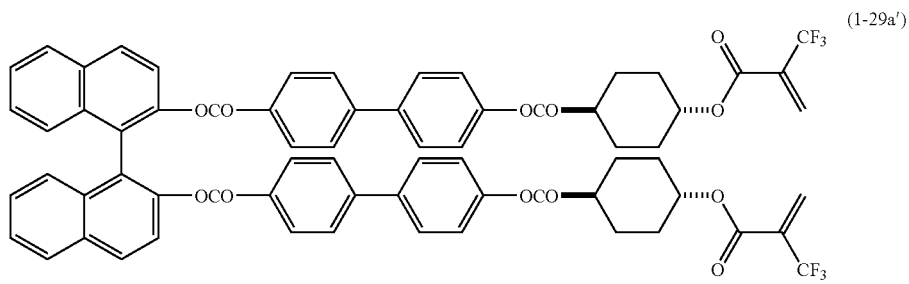

EXAMPLE 9

Preparation of Photopolymerizing Liquid-crystal Composition (Mix-5) and Production of Optical Thin Film:

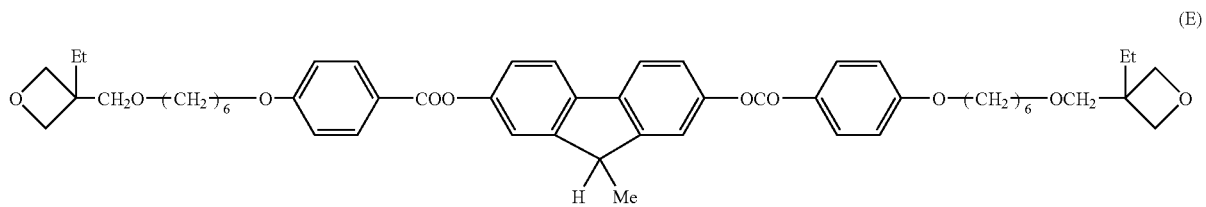

(E)

In the same manner as in Example 5 except that compound (E) [45 parts by weight] was used in place of the compound (A), a liquid-crystal composition (Mix-5) was prepared. The compound (E) was produced according to the method described in Japanese Patent Application No. 2003-203629. A mixed solvent of cyclopentanone/toluene (1:2) (3.0 g) and DTS-102 (20 mg) obtained. The transmission spectrum through the thus-obtained optical thin film was analyzed, and it confirmed the absence of selective reflection at 350 nm or more. The effective retardation at 550 nm was analyzed. In vertical light introduction, it was 0 nm, and when the light introduction was inclined at an angle of 40° from the normal line of the film face, it was −36 nm. This confirmed that the optical film served as a negative C-plate.

What is claimed is:

1. A compound of a formula (1):

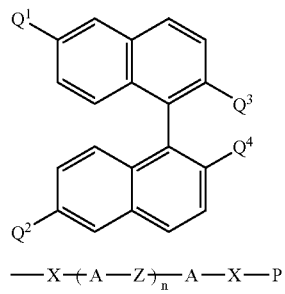

(1)

—X—(A—Z)$_n$—A—X—P    (2)

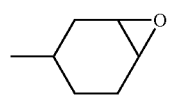 (P1)

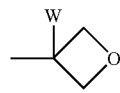 (P2)

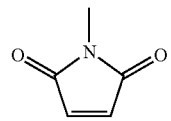 (P3)

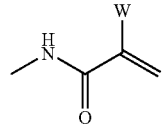 (P4)

-continued

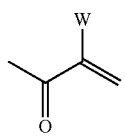 (P5)

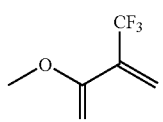 (P6)

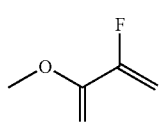 (P7)

 (P8)

wherein, in formula (1), $Q^1$ to $Q^4$ each independently represent a formula (2), a hydrogen atom, a halogen atom, or an alkyl group having from 1 to 30 carbon atoms; in the alkyl group, any —CH$_2$— may be substituted with —O—, —S—, —COO—, —OCO—, —CH=CH— or —C≡C—, and any hydrogen may be substituted with a halogen atom; at least two of $Q^1$ to $Q^4$ are the formula (2) and may differ from each other; in formula (2), A independently represents a 1,4-cyclohexylene group, a 1,4-phenylene group, a 1,4-cyclohexenylene group, a pyridine-2,5-diyl group, a pyridazine-3,6-diyl group, a pyrimidine-2,5-diyl group, a bicyclo[2.2.2]octane-1,4-diyl group, a naphthalene-2,6-diyl group, a tetrahydronaphthalene-2,6-diyl group, a decalin-2,6-diyl group, or a 1,3-dioxane-2,5-diyl group; any hydrogen in these rings may be substituted with a halogen atom, an alkyl group having from 1 to 3 carbon atoms, or a fluoroalkyl group having from 1 to 3 carbon atoms; X independently represents a single bond, or an alkylene group having from 1 to 20 carbon atoms; any —CH$_2$— in the alkylene group may be substituted with —O—, —S—, —COO— or —OCO—, and any hydrogen therein may be substituted with a fluorine atom; Z represents a single bond, —COO—, —OCO—, —CH$_2$CH$_2$—, —(CH$_2$)$_4$—, —CH$_2$O—, —OCH$_2$—, —(CH$_2$)$_3$O—, —O(CH$_2$)$_3$—, —CF$_2$CF$_2$—, —CH=CH—, —CH=CHCH$_2$CH$_2$—, —CH$_2$CH$_2$CH=CH—, —CH=CHCH$_2$O—, —OCH$_2$CH=CH—, —CF=CF—, —C≡C—, —CF$_2$O—, —OCF$_2$—, —CH$_2$CH$_2$CF$_2$O—, —OCF$_2$CH$_2$CH$_2$—, —CH$_2$CH$_2$COO—, —OCOCH$_2$CH$_2$—, —CH=CHCOO—, —OCOCH=CH—, —C≡CCOO— or —OCOC≡C—; n indicates an integer of from 0 to 3; when n is 1, 2 or 3, then plural A's may be the same or different; when n is 2 or 3, then plural Z's may be the same or different; P represents any one of polymerizing groups of formulae (P1) to (P8); W represents a hydrogen atom, a halogen atom, an alkyl group having from 1 to 3 carbon atoms, or a fluoroalkyl group having from 1 to 3 carbon atoms; provided that when $Q^1$ and $Q^2$ are both hydrogen atoms and when $Q^3$ and $Q^4$ are both formula (2), then P must not be (P8); provided that when P is (P5) and X is an alkylene group having from 1 to 20 carbon atoms, then the —CH$_2$— of the alkylene group directly bonded to P must not be substituted with —O—; provided that when $Q^1$ and $Q^2$ are both hydrogen atoms, $Q^3$ and $Q^4$ are both formula (2), the X directly bonded to the binaphthalene ring is —OCO—, n=0, A is a 1,4-phenylene group, the X directly bonded to P is —O(CH$_2$)$_4$OCH$_2$— and P is (P2), then W must not be ethyl.

2. The compound as claimed in claim 1, wherein $Q^1$ to $Q^4$ are independently a formula (2), a hydrogen atom, a fluorine atom, a chlorine atom, a bromine atom, or an alkyl group having from 1 to 25 carbon atoms; in the alkyl group, any —CH$_2$— may be substituted with —O—, —S—, —COO—, —OCO—, —CH=CH— or —C≡C—, and any hydrogen may be substituted with a halogen atom; A independently represents a 1,4-cyclohexylene group or a 1,4-phenylene group; any hydrogen in these rings may be substituted with a halogen atom, an alkyl group having from 1 to 3 carbon atoms, or a fluoroalkyl group having from 1 to 3 carbon atoms; X independently represents a single bond, —COO—, —OCO— or an alkylene group having from 1 to 10 carbon atoms; any —CH$_2$— in the alkylene group may be substituted with —O—, and any hydrogen therein may be substituted with a fluorine atom; Z represents a single bond, —COO—, —OCO—, —CH$_2$CH$_2$—, —CH$_2$O—, —OCH$_2$—, —CH=CH—, —C≡C—, —CH$_2$CH$_2$COO—, —OCOCH$_2$CH$_2$—, —CH=CHCOO— or —OCOCH=CH—.

3. The compound as claimed in claim 1, wherein $Q^1$ to $Q^4$ are independently a formula (2), a hydrogen atom, a fluorine atom, a chlorine atom, a bromine atom, or an alkyl group having from 1 to 10 carbon atoms; in the alkyl group, any —CH$_2$— may be substituted with —O—, —S—, —COO—, —OCO—, —CH=CH— or —C≡C—, and any hydrogen may be substituted with a halogen atom; A independently represents a 1,4-cyclohexylene group, a 1,4-phenylene group, or a 1,4-phenylene group in which any hydrogen is substituted with a fluorine atom, a chlorine atom, a methyl group or a trifluoromethyl group; X independently represents a single bond, or an alkylene group having from 1 to 10 carbon atoms; any —CH$_2$— in the alkylene group may be substituted with —O—, and any hydrogen therein may be substituted with a fluorine atom; Z represents a single bond, —COO—, —OCO—, —CH$_2$CH$_2$—, —CH$_2$O—, —OCH$_2$—, —C≡C—, —CH=CHCOO— or —OCOCH=CH—.

4. The compound as claimed in claim 2, wherein, in formula (2) in claim 1, P is (P2), (P3), (P5), (P6), (P7) or (P8).

5. The compound as claimed in claim 2, wherein, in formula (2) in claim 1, P is (P2), (P3), (P6), (P7) or (P8).

6. The compound as claimed in claim 2, wherein, in formula (2) in claim 1, P is (P2).

7. The compound as claimed in claim 1, wherein $Q^1$ and $Q^2$ are independently a halogen atom, or an alkyl group having from 1 to 30 carbon atoms; in the alkyl group, any —CH$_2$— may be substituted with —O—, —S—, —COO—, —OCO—, —CH=CH— or —C≡C—, and any hydrogen may be substituted with a halogen atom; $Q^3$ and $Q^4$ are independently a formula (2) and may differ from each other; and P is (P8).

8. The compound as claimed in claim 1, wherein $Q^1$ and $Q^2$ are independently a fluorine atom, a chlorine atom, a bromine atom, or an alkyl group having from 1 to 25 carbon atoms; in the alkyl group, any —CH$_2$— may be substituted with —O—, —S—, —COO—, —OCO—, —CH=CH— or —C≡C—, and any hydrogen may be substituted with a halogen atom; $Q^3$ and $Q^4$ are independently a formula (2) and may differ from each other; A is independently a 1,4-cyclohexylene group or a 1,4-phenylene group, and any hydrogen in these rings may be substituted with a halogen atom, an alkyl group having from 1 to 3 carbon atoms, or a fluoroalkyl group having from 1 to 3 carbon atoms; X is independently a single bond, —COO—, —OCO—, or an alkylene group having from 1 to 10 carbon atoms, in the alkylene group, any —CH$_2$— may be substituted with —O—, and any hydrogen may be substituted with a fluorine atom; Z is a single bond, —COO—, —OCO—, —CH$_2$CH$_2$—, —CH$_2$O—, —OCH$_2$—, —CH=CH—, —C≡C—, —CH$_2$CH$_2$COO—, —OCOCH$_2$CH$_2$—, —CH=CHCOO— or —OCOCH=CH—; and P is (P8).

9. The compound as claimed in claim 1, wherein $Q^1$ and $Q^2$ are independently a fluorine atom, a chlorine atom, a bromine atom, or an alkyl group having from 1 to 10 carbon atoms; in the alkyl group, any —CH$_2$— may be substituted with —O—, —S—, —COO—, —OCO—, —CH=CH— or —C≡C—, and any hydrogen may be substituted with a halogen atom; $Q^3$ and $Q^4$ are independently a formula (2) and may differ from each other; A is independently a 1,4-cyclohexylene group, a 1,4-phenylene group, or a 1,4-phenylene group in which any hydrogen is substituted with a fluorine atom, a chlorine atom, a methyl group or a trifluoromethyl group; X is independently a single bond, or an alkylene group having from 1 to 10 carbon atoms, in the alkylene group, any —CH$_2$— may be substituted with —O—, and any hydrogen may be substituted with a fluorine atom; Z is a single bond, —COO—, —OCO—, —CH$_2$CH$_2$—, —CH$_2$O—, —OCH$_2$—, —C≡C—, —CH=CHCOO— or —OCOCH=CH—; and P is (P8).

10. The compound as claimed in claim 1, wherein, in formula (1) in claim 1, $Q^1$ to $Q^4$ are independently a formula (2) and may differ from each other; in formula (2) in claim 1, P is (P8).

11. A liquid-crystal composition containing at least two compounds, in which at least one compound is a compound of claim 1.

12. The liquid-crystal composition as claimed in claim 11, wherein all the compounds are polymerizing compounds.

13. The liquid-crystal composition as claimed in claim 11, wherein at least one compound of claim 1 accounts for from 0.01 to 90% by weight relative to the overall amount of the composition, and at least one polymerizing compound selected from a group of compounds of the following formulae (M1) and (M2) accounts for from 10 to 99.99% by weight:

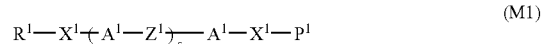

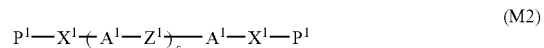

-continued

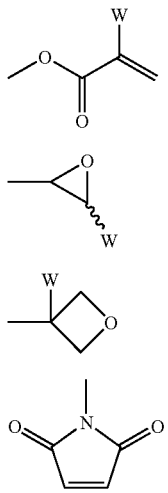

wherein, in formulae (M1) and (M2), P¹ independently represents any one polymerizing group of formulae (P9) to (P12); W represents a hydrogen atom, a halogen atom, an alkyl group having from 1 to 3 carbon atoms, or a fluoroalkyl group having from 1 to 3 carbon atoms; R¹ represents a hydrogen atom, a fluorine atom, a chlorine atom, —CN, or an alkyl group having from 1 to 20 carbon atoms; in the alkyl group, any —CH₂— may be substituted with —O—, —COO— or —OCO—, and any hydrogen may be substituted with a halogen atom; A¹ independently represents a 1,4-cyclohexylene group, a 1,4-phenylene group, a 1,4-cyclohexenylene group, a pyridine-2,5-diyl group, a pyrimidine-2,5-diyl group, a naphthalene-2,6-diyl group or a fluorene-2,7-diyl group; in these rings, any hydrogen may be substituted with a halogen atom, an alkyl group having from 1 to 3 carbon atoms, or a halogenoalkyl group having from 1 to 3 carbon atoms; X¹ independently represents a single bond or an alkylene group having from 1 to 20 carbon atoms; in the alkylene group, any —CH₂— may be substituted with —O—, —COO— or —OCO—; Z¹ independently represents a single bond, —COO—, —OCO—, —CH₂CH₂—, —CH=CH—, —C≡C—, —CH₂O—, —OCH₂—, —CF₂O—, —OCF₂—, —CH=CHCOO— or —OCOCH=CH—; s indicates an integer of from 1 to 3; when s is 1, 2 or 3, then plural A¹'s may be the same or different; when s is 2 or 3, then plural Z¹'s may be the same or different.

14. The liquid-crystal composition as claimed in claim 13, wherein at least one polymerizing compound selected from the group of compounds of formulae (M1) and (M2) is any one compound of formulae (M1a) to (M2c):

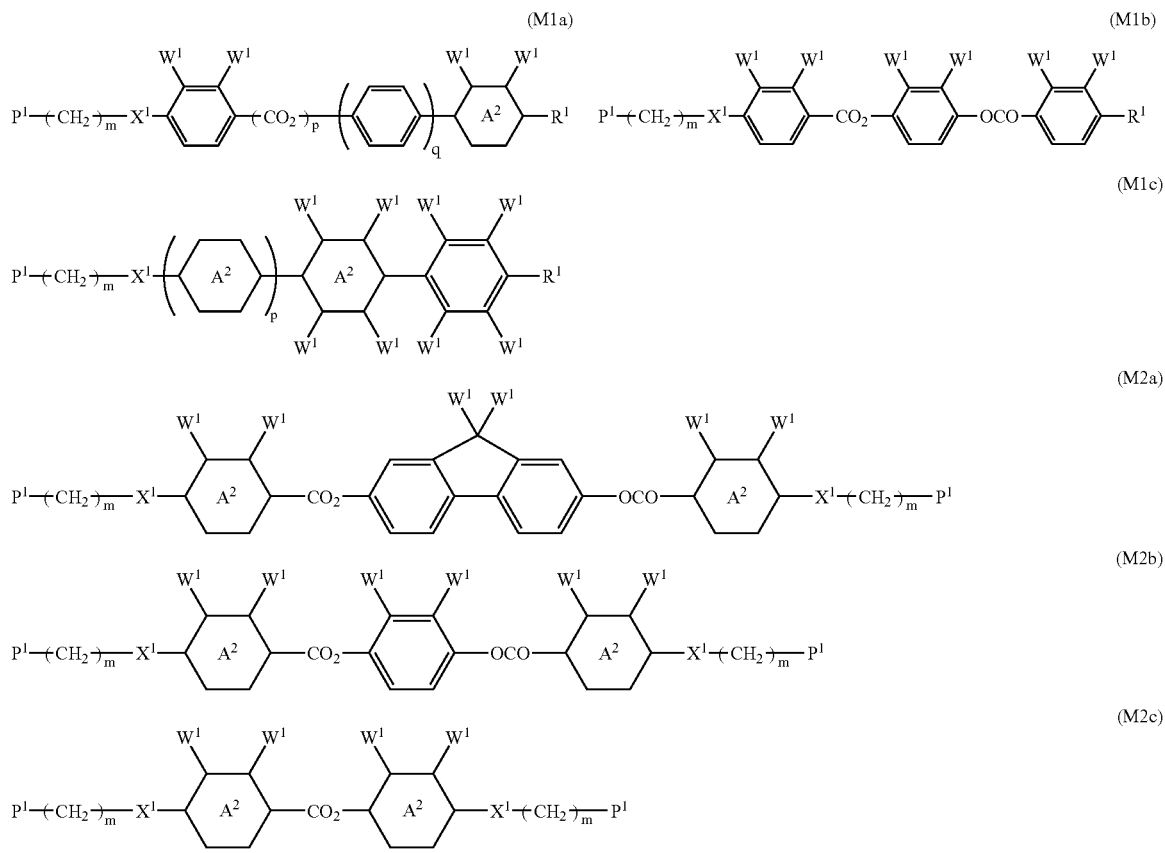

wherein $P^1$ is any one polymerizing group of formulae (P9) to (P-12); $R^1$ is a hydrogen atom, a fluorine atom, a chlorine atom, —CN, or an alkyl group having from 1 to 20 carbon atoms; in the alkyl group, any —CH$_2$— may be substituted with —O—, —COO— or —OCO—, and any hydrogen may be substituted with a halogen atom; the ring $A^2$ is independently a 1,4-cyclohexylene group or a 1,4-phenylene group; $W^1$ is independently a hydrogen atom, a halogen atom, an alkyl group having from 1 to 3 carbon atoms, or a halogenoalkyl group having from 1 to 3 carbon atoms; $X^1$ is independently a single bond or an alkylene group having from 1 to 20 carbon atoms; in the alkylene group, any —CH$_2$— may be substituted with —O—, —COO— or —OCO—; p and q are independently 0 or 1; m is independently an integer of from 0 to 5.

15. A polymer obtained through polymerization of at least one compound of claim 1.

16. A polymer obtained through polymerization of the composition of claim 11.

17. The polymer as claimed in claim 15, which has a weight-average molecular weight of from 500 to 1,000,000.

18. The polymer as claimed in claim 15, which has a weight-average molecular weight of from 1,000 to 500,000.

19. An optically-anisotropic shaped article obtained by orienting at least one compound of claim 1, and then polymerizing the compound through irradiation with electromagnetic waves to thereby fix the orientation condition of the liquid crystal.

20. The shaped article as claimed in claim 19, wherein the fixed orientation condition of the liquid crystal is twisted orientation.

21. An optical device comprising the shaped article of claim 19.

22. The optical device as claimed in claim 21, which has a helical pitch of from 1 nm to less than 200 nm.

23. The optical device as claimed in claim 21, which exhibits circular dichroism partly or entirely in a wavelength region of from 350 to 750 nm.

24. The optical device as claimed in claim 21, which exhibits circular dichroism in a UV region of from 100 to 350 nm.

25. A liquid-crystal display device that contains the polymer of claim 15.

26. A liquid-crystal display device that contains the shaped article of claim 19.

27. A liquid-crystal display device that contains the optical device of claim 21.

28. The compound as claimed in claim 1, wherein, in formula (1), $Q^1$ and $Q^2$ are hydrogen atoms, $Q^3$ and $Q^4$ are independently a formula (2'); in formula (2'), A is independently a 1,4-cyclohexylene group or a 1,4-phenylene group, Z is a single bond or —OCO—, W is a methyl group or an ethyl group, y is an integer of from 2 to 10, and n is 1 or 2

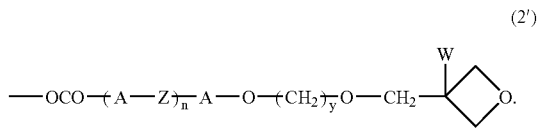

(2')

* * * * *